United States Patent
Coonrod et al.

(10) Patent No.: US 12,082,646 B2
(45) Date of Patent: Sep. 10, 2024

(54) FOOTWEAR AND FOOTWEAR COMPONENTS HAVING A MESH COMPONENT

(71) Applicant: adidas AG, Herzogenaurach (DE)

(72) Inventors: Zachary C. Coonrod, Portland, OR (US); Berin Skye B, Portland, OR (US); Keith A. Blume, Portland, OR (US); Derek Andrew Luther, Portland, OR (US); Ladan Salari-Sharif, Portland, OR (US); Iain Martin Hannah, Nuremberg (DE); Jacques M. Perrault, Portland, OR (US); Christian Manuel Arias Delgado, Portland, OR (US); Dustin Kendrick, San Francisco, CA (US)

(73) Assignee: adidas AG, Herzogenaurach (DE)

( * ) Notice: Subject to any disclaimer, the term of this patent is extended or adjusted under 35 U.S.C. 154(b) by 0 days.

(21) Appl. No.: 17/069,623

(22) Filed: Oct. 13, 2020

(65) Prior Publication Data

US 2022/0110408 A1 Apr. 14, 2022

(51) Int. Cl.
*A43B 13/18* (2006.01)
(52) U.S. Cl.
CPC .................. *A43B 13/187* (2013.01)
(58) Field of Classification Search
CPC ..... A43B 13/187; A43B 13/16; A43B 13/186; A43B 13/125; A43B 5/185; A43B 13/12; A43B 5/00; A43B 13/28; A43B 13/142; B33Y 80/00; A41D 23/00
See application file for complete search history.

(56) References Cited

U.S. PATENT DOCUMENTS

| | | | |
|---|---|---|---|
| 354,693 | A | 12/1886 | Dick |
| D29,749 | S | 11/1898 | Bunker |
| 1,111,437 | A | 9/1914 | Butterfield |
| D90,057 | S | 5/1933 | Cleef |
| D107,977 | S | 1/1938 | Tousley |
| D113,620 | S | 3/1939 | Cairns |

(Continued)

FOREIGN PATENT DOCUMENTS

| | | |
|---|---|---|
| CN | 101611953 A | 12/2009 |
| CN | 102578760 A | 7/2012 |

(Continued)

OTHER PUBLICATIONS

Adidas Breaks the Mould With 3D-Printed Performance Footwear, [Retrieved on Oct. 7, 2015], Retrieved from the Internet: (http://www.adidas-group.com/en/media/news-archive/press-releases/2015/adi-das-breaks-mould-3d-printed-performance-footwear/).

(Continued)

*Primary Examiner* — Clinton T Ostrup
*Assistant Examiner* — Akwokwo Olabisi Redhead
(74) *Attorney, Agent, or Firm* — Sterne, Kessler, Goldstein & Fox P.L.L.C.

(57) ABSTRACT

An article of footwear may include a sole and an upper connected to the sole. The sole may include a first solid component and a second solid component. The sole may further include an additively manufactured mesh component that is arranged between the first solid component and the second solid component. The mesh component may be connected to each of the first solid component and the second solid component.

22 Claims, 21 Drawing Sheets

(56) References Cited

U.S. PATENT DOCUMENTS

| | | |
|---|---|---|
| D115,636 S | 7/1939 | Sperry |
| 2,205,356 A | 6/1940 | Rose et al. |
| D123,898 S | 12/1940 | Tousley |
| D138,517 S | 8/1944 | Meltzer |
| 2,853,809 A | 9/1958 | Carlo et al. |
| D196,491 S | 10/1963 | Papoutsy |
| 3,253,601 A | 5/1966 | Scholl |
| 3,416,174 A | 12/1968 | Novitske |
| 3,793,750 A | 2/1974 | Bowerman |
| D241,484 S | 9/1976 | Castano |
| D241,688 S | 10/1976 | Johnson |
| 4,012,855 A | 3/1977 | Gardner |
| D254,818 S | 4/1980 | Jones |
| D255,175 S | 6/1980 | Iwakata |
| D255,177 S | 6/1980 | Fuzita |
| D255,178 S | 6/1980 | Fuzita |
| D257,075 S | 9/1980 | Amicone et al. |
| 4,271,606 A | 6/1981 | Rudy |
| 4,297,796 A * | 11/1981 | Stirtz .................. A43B 13/18 36/28 |
| 4,309,831 A | 1/1982 | Pritt |
| D265,605 S | 8/1982 | Batra |
| 4,378,643 A | 4/1983 | Johnson |
| D272,963 S | 3/1984 | Muller et al. |
| 4,439,936 A | 4/1984 | Clarke et al. |
| D273,631 S | 5/1984 | Ueda |
| D278,851 S | 5/1985 | Austin |
| D279,620 S | 7/1985 | Ueda |
| D281,459 S | 11/1985 | Parker |
| 4,607,440 A | 8/1986 | Roberts et al. |
| D288,621 S | 3/1987 | Surpuriya et al. |
| D297,383 S | 8/1988 | Mourad et al. |
| 4,774,774 A | 10/1988 | Allen, Jr. |
| D299,681 S | 2/1989 | Miller et al. |
| D301,184 S | 5/1989 | Hase |
| D301,800 S | 6/1989 | Mitsui |
| D302,352 S | 7/1989 | Austin |
| D303,316 S | 9/1989 | Crowley |
| D307,817 S | 5/1990 | Schneider |
| D312,920 S | 12/1990 | Aveni |
| D316,324 S | 4/1991 | Rogers |
| D321,973 S | 12/1991 | Hatfield |
| D326,181 S | 5/1992 | Katz et al. |
| D333,555 S | 3/1993 | Hatfield et al. |
| D335,385 S | 5/1993 | Kawabata |
| D335,572 S | 5/1993 | Peterson |
| D336,775 S | 6/1993 | Smith |
| D337,428 S | 7/1993 | Allen, III et al. |
| 5,236,637 A | 8/1993 | Hull |
| D339,464 S | 9/1993 | Teague |
| 5,337,492 A | 8/1994 | Anderie et al. |
| 5,367,791 A | 11/1994 | Gross et al. |
| D354,693 S | 1/1995 | Miller |
| 5,391,072 A | 2/1995 | Lawton et al. |
| 5,423,135 A | 6/1995 | Poole et al. |
| D370,993 S | 6/1996 | Mangee |
| 5,529,473 A | 6/1996 | Lawton et al. |
| D384,795 S | 10/1997 | Hudson |
| D384,796 S | 10/1997 | Smith, III |
| D387,698 S | 12/1997 | Hatfield et al. |
| D389,993 S | 2/1998 | Ryan |
| D390,348 S | 2/1998 | Meyer et al. |
| D390,690 S | 2/1998 | Murai et al. |
| D391,747 S | 3/1998 | Avar |
| D393,341 S | 4/1998 | Marshall et al. |
| D394,342 S | 5/1998 | Schneider |
| D394,741 S | 6/1998 | Gaudio |
| D395,340 S | 6/1998 | Tresser |
| D395,343 S | 6/1998 | Lozano |
| D395,740 S | 7/1998 | Cass |
| D395,743 S | 7/1998 | Ryan |
| D397,546 S | 9/1998 | Merceron |
| 5,799,417 A | 9/1998 | Burke et al. |
| D400,345 S | 11/1998 | Teaque |
| D401,745 S | 12/1998 | Greenberg |
| D401,747 S | 12/1998 | Cessor |
| D402,450 S | 12/1998 | Munns |
| 5,862,614 A | 1/1999 | Koh |
| D404,897 S | 2/1999 | Marshall |
| D407,892 S | 4/1999 | Gaudio |
| D408,972 S | 5/1999 | Greenberg |
| D411,910 S | 7/1999 | Cessor |
| D412,050 S | 7/1999 | Chassaing |
| D412,239 S | 7/1999 | Sorofman |
| 5,930,916 A | 8/1999 | Connor |
| 5,983,529 A | 11/1999 | Serna |
| 5,985,383 A | 11/1999 | Allen et al. |
| 6,014,821 A | 1/2000 | Yaw |
| D420,208 S | 2/2000 | Birkenstock |
| 6,021,588 A | 2/2000 | Alviso |
| 6,076,283 A | 6/2000 | Boie |
| D432,762 S | 10/2000 | Weege |
| D432,763 S | 10/2000 | Smith, III |
| D433,215 S | 11/2000 | Smith, III |
| D442,768 S | 5/2001 | Matis |
| 6,259,962 B1 | 7/2001 | Gothait |
| 6,367,172 B2 | 4/2002 | Hernandez |
| D458,441 S | 6/2002 | Gillespie |
| D459,865 S | 7/2002 | Urie et al. |
| D461,040 S | 8/2002 | Urie et al. |
| D480,540 S | 10/2003 | Hoyt et al. |
| 6,665,958 B2 | 12/2003 | Goodwin |
| D485,662 S | 1/2004 | Magro |
| D488,916 S | 4/2004 | McClaskie |
| 6,763,611 B1 | 7/2004 | Fusco |
| D497,707 S | 11/2004 | Lee |
| D500,399 S | 1/2005 | Fuerst |
| D515,791 S | 2/2006 | McClaskie |
| D529,697 S | 10/2006 | Earle |
| D536,163 S | 2/2007 | McClaskie |
| D538,519 S | 3/2007 | McClaskie |
| D552,337 S | 10/2007 | Parekh et al. |
| D556,988 S | 12/2007 | Horne et al. |
| D561,438 S | 2/2008 | Belley |
| D561,439 S | 2/2008 | Schoenborn et al. |
| D561,443 S | 2/2008 | Robinson, Jr. et al. |
| 7,383,647 B2 | 6/2008 | Chan et al. |
| D572,462 S | 7/2008 | Hatfield et al. |
| D577,883 S | 10/2008 | Link |
| 7,438,846 B2 | 10/2008 | John |
| D586,994 S | 2/2009 | Chang |
| D593,741 S | 6/2009 | Vico et al. |
| D608,991 S | 2/2010 | Lamont |
| 7,676,955 B2 | 3/2010 | Dojan et al. |
| 7,704,430 B2 | 4/2010 | Johnson et al. |
| D616,640 S | 6/2010 | Werman |
| D621,143 S | 8/2010 | Lamont |
| 7,892,474 B2 | 2/2011 | Shkolnik et al. |
| D638,616 S | 5/2011 | Gibson |
| 8,110,135 B2 | 2/2012 | El-Siblani |
| D659,358 S | 5/2012 | Van Zyll de Jong et al. |
| 8,191,284 B2 | 6/2012 | Cho |
| D666,391 S | 9/2012 | Van Zyll de Jong et al. |
| D672,949 S | 12/2012 | Bramani et al. |
| D686,402 S | 7/2013 | Portzline |
| 8,522,454 B2 | 9/2013 | Schindler et al. |
| D691,359 S | 10/2013 | Della Valle et al. |
| D695,502 S | 12/2013 | Miner |
| D696,004 S | 12/2013 | Della Valle et al. |
| D696,505 S | 12/2013 | Miner |
| D697,294 S | 1/2014 | Miner |
| D702,028 S | 4/2014 | Truelsen |
| D702,428 S | 4/2014 | Hlavacs |
| D703,425 S | 4/2014 | Lee |
| 8,739,639 B2 | 6/2014 | Owings et al. |
| D707,933 S | 7/2014 | McCourt |
| D709,274 S | 7/2014 | Roulo |
| 8,776,396 B2 | 7/2014 | Huynh |
| D711,637 S | 8/2014 | Miner |
| D713,628 S | 9/2014 | Greenspan |
| D741,586 S | 10/2015 | Truelsen |
| D743,154 S | 11/2015 | Nethongkome |
| D744,212 S | 12/2015 | Boudreau et al. |
| 9,205,601 B2 | 12/2015 | DeSimone et al. |

(56) References Cited

U.S. PATENT DOCUMENTS

| | | |
|---|---|---|
| 9,211,678 B2 | 12/2015 | DeSimone et al. |
| 9,216,546 B2 | 12/2015 | DeSimone et al. |
| D747,860 S | 1/2016 | De Costa Pereira Machado |
| D751,797 S | 3/2016 | Slimane |
| 9,320,316 B2 | 4/2016 | Guyan et al. |
| 9,453,142 B2 | 9/2016 | Rolland et al. |
| D769,593 S | 10/2016 | Chang |
| D773,162 S | 12/2016 | Lane, III et al. |
| D779,174 S | 2/2017 | De Montgolfier |
| D783,973 S | 4/2017 | Anceresi |
| D784,666 S | 4/2017 | Lok |
| D789,060 S | 6/2017 | Guyan et al. |
| D790,821 S | 7/2017 | Beers et al. |
| D792,689 S | 7/2017 | Mokos |
| D796,170 S | 9/2017 | Raysse |
| D796,806 S | 9/2017 | Durand |
| D798,561 S | 10/2017 | Ford |
| D799,184 S | 10/2017 | Chang |
| D800,432 S | 10/2017 | Klein |
| D802,896 S | 11/2017 | Rademacher et al. |
| D804,792 S | 12/2017 | De Montgolfier et al. |
| D809,752 S | 2/2018 | Campbell |
| D812,882 S | 3/2018 | Jenkins et al. |
| 9,930,929 B2 | 4/2018 | Cooper et al. |
| D816,961 S | 5/2018 | Bardea |
| D819,310 S | 6/2018 | Lashmore |
| D822,351 S | 7/2018 | DeAlmeida |
| 10,010,133 B2 | 7/2018 | Guyan |
| 10,010,134 B2 | 7/2018 | Guyan |
| 10,016,013 B2 | 7/2018 | Kormann et al. |
| 10,034,516 B2 | 7/2018 | Gheorghian et al. |
| D825,163 S | 8/2018 | Montross et al. |
| D825,165 S | 8/2018 | Gibson et al. |
| 10,039,343 B2 | 8/2018 | Guyan |
| D829,425 S | 10/2018 | Albrecht et al. |
| D831,315 S | 10/2018 | Mahoney |
| D831,317 S | 10/2018 | Jenkins et al. |
| 10,104,934 B2 | 10/2018 | Guyan |
| D836,892 S | 1/2019 | Jenkins et al. |
| D841,299 S | 2/2019 | Nikolic |
| D841,300 S | 2/2019 | Albrecht et al. |
| D841,301 S | 2/2019 | Albrecht et al. |
| D841,964 S | 3/2019 | Kaiserswerth |
| 10,231,511 B2 | 3/2019 | Guyan et al. |
| D844,953 S | 4/2019 | Chen et al. |
| D845,610 S | 4/2019 | Mayden et al. |
| 10,259,171 B2 | 4/2019 | Robeson et al. |
| D847,481 S | 5/2019 | Albrecht et al. |
| D848,716 S | 5/2019 | Shyllon |
| D849,382 S | 5/2019 | Jenkins et al. |
| D850,083 S | 6/2019 | Jenkins et al. |
| D851,873 S | 6/2019 | Maier |
| D854,300 S | 7/2019 | Evans |
| D855,957 S | 8/2019 | Evans |
| D857,350 S | 8/2019 | Hardy |
| D857,360 S | 8/2019 | Hardy |
| D857,362 S | 8/2019 | Thompson |
| D858,066 S | 9/2019 | Hatfield |
| D859,801 S | 9/2019 | Jenkins et al. |
| D860,614 S | 9/2019 | Bishoff |
| D862,051 S | 10/2019 | Goussev et al. |
| D862,866 S | 10/2019 | Albrecht et al. |
| 10,426,226 B2 | 10/2019 | Guyan et al. |
| 10,434,706 B2 | 10/2019 | Robeson et al. |
| D869,830 S | 12/2019 | Lucas et al. |
| D871,033 S | 12/2019 | Nikolic |
| D872,426 S | 1/2020 | Taylor |
| D873,546 S | 1/2020 | Henrichot |
| D876,056 S | 2/2020 | Henrichot |
| D878,016 S | 3/2020 | Henrichot |
| D879,428 S | 3/2020 | Braun et al. |
| D879,434 S | 3/2020 | Fick et al. |
| 10,575,588 B2 | 3/2020 | Perrault et al. |
| D880,120 S | 4/2020 | Fick et al. |
| D880,122 S | 4/2020 | Fick et al. |
| D880,131 S | 4/2020 | Fick et al. |
| D882,227 S | 4/2020 | Braun et al. |
| 10,639,861 B2* | 5/2020 | Minh Le ............... A43B 13/04 |
| D890,485 S | 7/2020 | Perrault et al. |
| 2002/0078598 A1 | 6/2002 | Bell |
| 2004/0087230 A1 | 5/2004 | Wildeman |
| 2006/0201028 A1 | 9/2006 | Chan et al. |
| 2007/0011914 A1 | 1/2007 | Keen et al. |
| 2007/0043582 A1 | 2/2007 | Peveto et al. |
| 2008/0289218 A1 | 11/2008 | Nakano |
| 2009/0013556 A1* | 1/2009 | Nishiwaki ............ A43B 13/181 36/28 |
| 2009/0126225 A1 | 5/2009 | Jarvis |
| 2009/0139112 A1 | 6/2009 | Garneau |
| 2009/0183392 A1 | 7/2009 | Shane |
| 2009/0293309 A1 | 12/2009 | Keating et al. |
| 2010/0122471 A1 | 5/2010 | Edington et al. |
| 2010/0170106 A1 | 7/2010 | Brewer et al. |
| 2010/0199520 A1 | 8/2010 | Dua et al. |
| 2010/0251565 A1 | 10/2010 | Litchfield et al. |
| 2010/0281714 A1 | 11/2010 | Carboy et al. |
| 2011/0099855 A1 | 5/2011 | Cho |
| 2012/0117825 A9 | 5/2012 | Jarvis |
| 2012/0178259 A1 | 7/2012 | Miyazaki et al. |
| 2012/0180335 A1 | 7/2012 | Mahoney |
| 2012/0186107 A1 | 7/2012 | Crary et al. |
| 2013/0118036 A1 | 5/2013 | Gibson |
| 2013/0145653 A1 | 6/2013 | Bradford |
| 2013/0171019 A1 | 7/2013 | Gessler et al. |
| 2013/0292862 A1 | 11/2013 | Joyce |
| 2013/0295212 A1 | 11/2013 | Chen et al. |
| 2014/0020191 A1 | 1/2014 | Jones et al. |
| 2014/0026773 A1 | 1/2014 | Miller |
| 2014/0029030 A1 | 1/2014 | Miller |
| 2014/0109441 A1 | 4/2014 | McDowell et al. |
| 2014/0150297 A1 | 6/2014 | Holmes et al. |
| 2014/0182170 A1 | 7/2014 | Wawrousek et al. |
| 2014/0223783 A1 | 8/2014 | Wardlaw et al. |
| 2014/0226773 A1 | 8/2014 | Toth et al. |
| 2014/0259779 A1 | 9/2014 | Hashish et al. |
| 2014/0259787 A1 | 9/2014 | Guyan et al. |
| 2014/0259788 A1 | 9/2014 | Dojan et al. |
| 2014/0259789 A1 | 9/2014 | Dojan et al. |
| 2014/0299009 A1 | 10/2014 | Miller et al. |
| 2014/0300675 A1 | 10/2014 | Miller et al. |
| 2014/0300676 A1 | 10/2014 | Miller et al. |
| 2014/0310991 A1 | 10/2014 | Greene et al. |
| 2015/0000161 A1* | 1/2015 | Peyton ............... A43B 3/246 36/103 |
| 2015/0033577 A1 | 2/2015 | Dahl et al. |
| 2015/0033579 A1* | 2/2015 | Barnes ............... A43B 13/185 36/83 |
| 2015/0033581 A1* | 2/2015 | Barnes ............... A43B 13/125 36/83 |
| 2015/0089841 A1 | 4/2015 | Smaldone et al. |
| 2015/0181976 A1 | 7/2015 | Cooper et al. |
| 2015/0223560 A1 | 8/2015 | Wawrousek et al. |
| 2015/0245686 A1 | 9/2015 | Cross |
| 2015/0331402 A1 | 11/2015 | Lin et al. |
| 2015/0351493 A1 | 12/2015 | Ashcroft et al. |
| 2015/0360419 A1 | 12/2015 | Willis et al. |
| 2016/0051009 A1 | 2/2016 | Kormann et al. |
| 2016/0122493 A1 | 5/2016 | Farris et al. |
| 2016/0137839 A1 | 5/2016 | Rolland et al. |
| 2016/0160077 A1 | 6/2016 | Rolland et al. |
| 2016/0180440 A1 | 6/2016 | Dibenedetto et al. |
| 2016/0288376 A1 | 10/2016 | Sun et al. |
| 2016/0295971 A1 | 10/2016 | Arnese et al. |
| 2016/0324260 A1 | 11/2016 | Guyan |
| 2016/0324261 A1 | 11/2016 | Guyan |
| 2016/0360828 A1 | 12/2016 | Guyan |
| 2016/0374428 A1 | 12/2016 | Kormann et al. |
| 2017/0129167 A1 | 5/2017 | Castanon |
| 2017/0129169 A1 | 5/2017 | Batchelder et al. |
| 2017/0150778 A1 | 6/2017 | Youngs et al. |
| 2018/0014606 A1 | 1/2018 | Mokos |
| 2018/0103719 A1 | 4/2018 | Chen |
| 2018/0126630 A1 | 5/2018 | Panzer et al. |
| 2018/0243976 A1 | 8/2018 | Feller |

(56) References Cited

U.S. PATENT DOCUMENTS

| | | |
|---|---|---|
| 2018/0271211 A1 | 9/2018 | Perrault et al. |
| 2018/0271213 A1 | 9/2018 | Perrault et al. |
| 2018/0290374 A1 | 10/2018 | Willis et al. |
| 2018/0368518 A1 | 12/2018 | Re et al. |
| 2019/0069632 A1 | 3/2019 | Meschter |
| 2019/0098960 A1 | 4/2019 | Weisskopf et al. |
| 2019/0160733 A1 | 5/2019 | Mirkin et al. |
| 2019/0223543 A1* | 7/2019 | Tamm ............ A43B 1/00 |
| 2019/0223551 A1 | 7/2019 | Hoffer et al. |
| 2019/0269200 A1 | 9/2019 | Tseng |
| 2019/0289960 A1 | 9/2019 | Loveder |
| 2020/0093221 A1 | 3/2020 | Caldwell et al. |
| 2020/0156308 A1 | 5/2020 | Ramos et al. |
| 2020/0329815 A1 | 10/2020 | Schmid |
| 2021/0195989 A1 | 7/2021 | Iwasa et al. |
| 2021/0195995 A1 | 7/2021 | Sakamoto et al. |

FOREIGN PATENT DOCUMENTS

| | | | |
|---|---|---|---|
| CN | 203378623 U | 1/2014 | |
| CN | 209391169 U | 9/2019 | |
| CN | 209403686 U | 9/2019 | |
| CN | 110859355 A | 3/2020 | |
| EP | 0526892 A2 | 2/1993 | |
| EP | 2564719 A1 | 3/2013 | |
| EP | 2424398 B1 | 12/2015 | |
| EP | 3013171 A1 | 5/2016 | |
| EP | 3165169 A1 | 5/2017 | |
| EP | 2564714 B1 * | 7/2018 | ........... A43B 1/0027 |
| EP | 3939462 A2 | 1/2022 | |
| ES | 2442448 A1 | 2/2014 | |
| ES | 2578730 A1 | 7/2016 | |
| JP | 2002238609 A | 8/2002 | |
| JP | 2011251190 A | 12/2011 | |
| JP | 2014151201 A | 8/2014 | |
| JP | 3192899 U | 9/2014 | |
| WO | 2010126708 A2 | 11/2010 | |
| WO | 2014008331 A2 | 1/2014 | |
| WO | 2014015037 A2 | 1/2014 | |
| WO | WO-2014009587 A1 | 1/2014 | |
| WO | 2014100462 A1 | 6/2014 | |
| WO | 2015164234 A1 | 10/2015 | |
| WO | 2015169941 A1 | 11/2015 | |
| WO | 2015169942 A1 | 11/2015 | |
| WO | 2016066750 A1 | 5/2016 | |
| WO | 2017210298 A1 | 12/2017 | |
| WO | WO-2021169804 A1 | 9/2021 | |

OTHER PUBLICATIONS

Green, D., Adidas is finally bringing 3D-printed shoes into the mainstream, Business Insider.com, Dennis Green, Retrieved from the Internet: (URL:https://www.businessinsider.com/adidas-releases-futurecraft-4d-shoe-2017-4/commerce-on-business-insider), (Year: 2017).

Januszewicz, R., et al., "Layerless Fabrication With Continuous Liquid Interface Production," PNAS 113 (42):11703-11708, University of Illinois (Oct. 2016).

Nikolic, I., Reebok Flexagon Training Shoes, Behance.net, Ilija Nikolic, Retrieved from the Internet (URL: https://www.behance.net/gallery/68953047/REEBOK-FLEXAGON-Training-Shoes?t-racking_source=curated_galleries_list) 2018, 10 pages.

Panetta., et al., "Elastic Textures for Additive Fabrication," ACM Transactions on Graphics 34(4), Article No. 135, (Aug. 2015).

Pearson, D., Adidas is giving Olympic athletes its first-ever 3D-printed shoes, Highsnobiety.com, Retrieved from the Internet: (URL:https://www.highsnobiety.com/2016/08/11/adidas-3d-printed-shoes-olympics/), (Year: 2016).

Reebok Flexagon, Retrieved from the Internet (URL: https://www.reebok.com/us/reebok-flexagon/CN2583.html), 2018.

Richard, B., Here's what 3D printed Future Craft adidas Yeezy boosts would look like Yeezys geared up for the future Retrieved from the Internet: (URL:https://solecollector.com/news/2015/11/adidas-yeezy-futurecraft-3d-print), (Year: 2015).

Tumbleston, J.R., et al., "Continuous Liquid Interface Production of 3d Objects," Science 347(6228): 1349-1352, American Association for the Advancement of Science (Mar. 2015).

Worman, C., Top Tennis Shoes Featuring a 6-Month Outsole Warranty, Retrieved from the Internet (URL: https://blogs.tennisexpress.com/blogs/top-tennis-shoes-featuring- -a-6-month-outsole-warranty/), (Year: 2018), 11 pages.

* cited by examiner

1800

1900

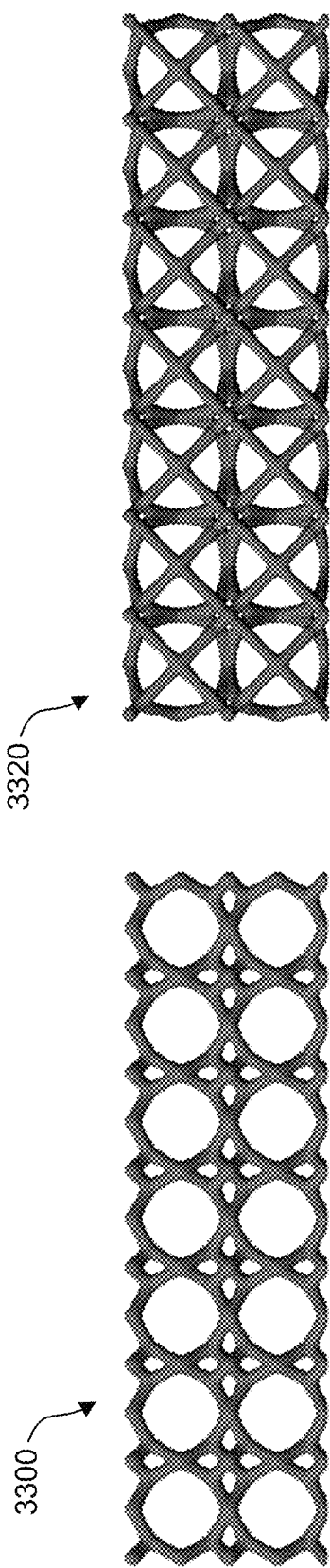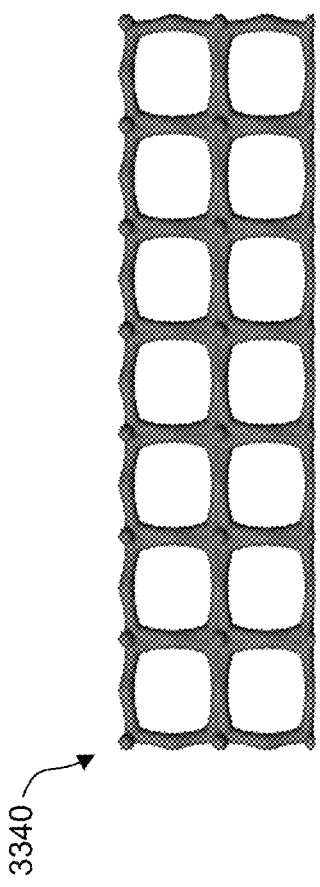
FIG. 33A
FIG. 33B
FIG. 33C

FOOTWEAR AND FOOTWEAR COMPONENTS HAVING A MESH COMPONENT

FIELD

Embodiments described herein generally relate to footwear and footwear components having a mesh component. Specifically, embodiments described herein relate to footwear and footwear components that include a sole having a solid component and an additively manufactured mesh component.

BACKGROUND

Footwear generally includes a sole that provides support and cushioning to a wearer's foot and an upper attached to the sole that encloses the wearer's foot. The sole may be constructed to provide the desired comfort and performance characteristics for the wearer. Soles may be made by molding a foam material, such as ethylene vinyl acetate (EVA), among others. Manufacturing a sole by molding may be inexpensive, but molding methods may provide limited ability to customize the performance characteristics of the sole.

Runners and other athletes may desire footwear having specific performance characteristics to optimize their performance. Further, customization of the sole may allow the footwear to be tailored to a particular athlete. Thus, methods of forming a midsole that allow for greater customization of the resulting properties and performance characteristics of the sole is desired.

BRIEF SUMMARY

Some embodiments described herein relate to an article of footwear that includes a sole and an upper connected to the sole. The sole of the article of footwear may include a first solid component, a second solid component, and an additively manufactured mesh component arranged between the first solid component and the second solid component, and the mesh component may be connected to each of the first solid component and the second solid component.

In any of the various embodiments disclosed herein, the first solid component and the second solid component may each include a foam material.

In any of the various embodiments disclosed herein, the mesh component may include a plurality of interconnected unit cells.

In any of the various embodiments disclosed herein, the sole may include a toe region, a midfoot region, and a heel region, and the first solid component may extend from the toe region toward the midfoot region. In some embodiments, the second solid component may be arranged at the heel region.

In any of the various embodiments disclosed herein, the sole may include a toe region, a midfoot region, and a heel region, the mesh component may extend from the lower end of the sole to the upper end of the sole, and the mesh component may extend from the midfoot region to the heel region.

In any of the various embodiments disclosed herein, the mesh component of the sole may overlap with a portion of the upper.

In any of the various embodiments disclosed herein, the mesh component may define a cavity. In some embodiments, an insert may be arranged within the cavity. In some embodiments, particles may be arranged within the cavity.

In any of the various embodiments disclosed herein, a filler material may be disposed within the mesh component. In some embodiments, the mesh component may include a port configured to facilitate injection of the filler material into the mesh component.

Some embodiments described herein relate to article of footwear that includes a sole and an upper connected to the sole. The sole of the article of footwear may include a solid component extending from a toe region to a heel region of the sole and having an upper end opposite a lower end that is a ground-engaging surface, and a mesh component connected to the upper end of the solid component at the heel region of the sole and extending toward a midfoot region of the sole.

In any of the various embodiments disclosed herein, the mesh component may be additively manufactured.

In any of the various embodiments disclosed herein, the solid component may include a lip extending around a perimeter of the solid component at the upper end of the solid component.

In any of the various embodiments disclosed herein, the sole may include a recess that separates a portion of the mesh component from the solid component.

Some embodiments described herein relate to a sole for an article of footwear that includes a first solid component that includes a foam material, wherein the first solid component is arranged at a toe region of the sole. The sole may also include a second solid component that includes a second foam material, wherein the second solid component is arranged at a heel region of the sole. The sole may further include an additively manufactured mesh component arranged between the first solid component and the second solid component, wherein the mesh component is connected to the first solid component and to the second solid component.

In any of the various embodiments described herein, the foam material and the second foam material may be the same material.

In any of the various embodiments described herein, the mesh component may extend from a lower end of the sole that is a ground-engaging surface to an upper end of the sole.

In any of the various embodiments described herein, the sole may have a concave curvature at the heel region.

BRIEF DESCRIPTION OF THE DRAWINGS

The accompanying drawings, which are incorporated herein and form a part of the specification, illustrate the present disclosure and, together with the description, further serve to explain the principles thereof and to enable a person skilled in the pertinent art to make and use the same.

FIGS. 33A-33C show isotropic lattice structures for stiff sub-cells according to some embodiments.

DETAILED DESCRIPTION

Figure 1:
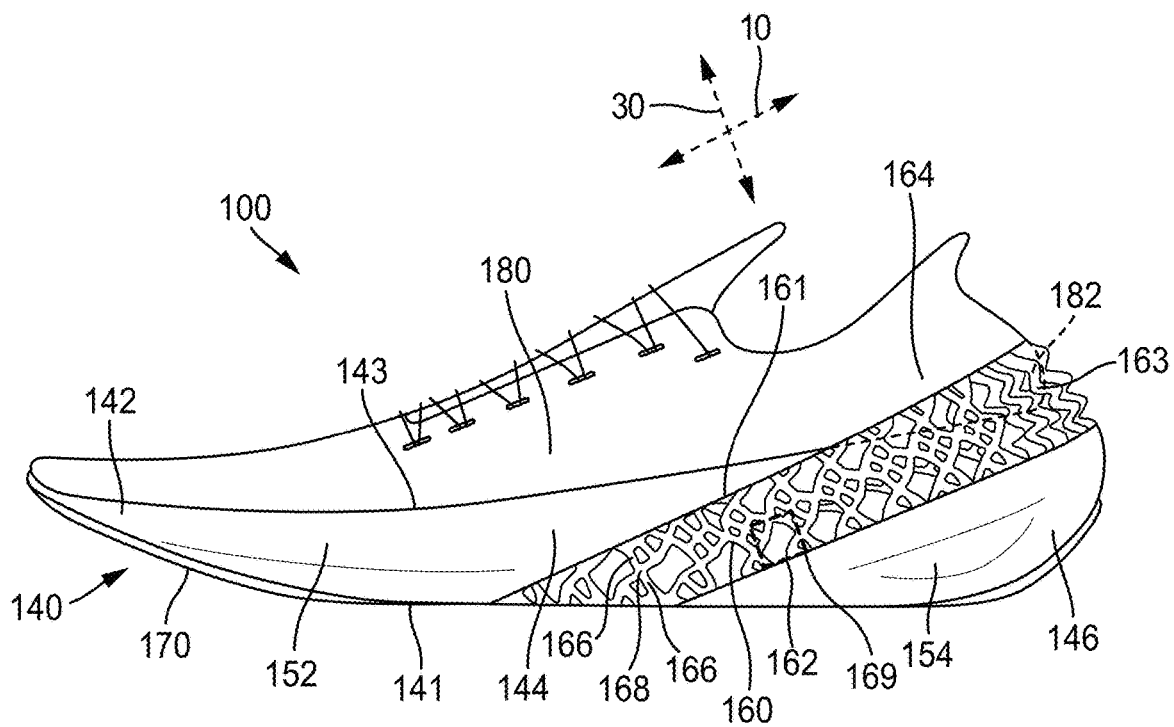
FIG. 1 shows a side view of footwear having a sole with a mesh component according to some embodiments.

Reference will now be made in detail to representative embodiments illustrated in the accompanying drawing. It should be understood that the following descriptions are not intended to limit the embodiments to one preferred embodiment. To the contrary, it is intended to cover alternatives, modifications, and equivalents as can be included within the spirit and scope of the described embodiments as defined by the claims.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Soles and midsoles of footwear are often formed by molding methods, such as by injection or compression molding. In some cases, when midsoles are molded in one piece, the properties of the resulting midsole cannot be made to vary across different portions of the midsole. As a result, the molded midsole may have isotropic properties. However, in some cases, it may be desirable to provide a midsole with mechanical properties that vary across or within different regions and/or that vary depending on the directions in which the midsole is loaded to improve the performance of the midsole and allow for customization of the performance of the midsole. For example, it may be desirable to provide a midsole with anisotropic properties that vary on different portions of the midsole in order to improve the performance of the midsole and allow for customization of the performance of the midsole.

Some embodiments described herein relate to footwear having a sole that includes a mesh component to provide the sole with desired properties, for example anisotropic properties. The mesh component may be customized to provide different properties in different regions of the sole. In certain embodiments, anisotropic properties may help to guide a foot of an athlete during sports movements, or may be used to guide a foot of a wearer in daily use. Further, selective mechanical deformation of the mesh component may be achieved to provide stride length gains during phases of ground contact while walking or running. Such stride length gains can be optimized by selection of the geometry and dimensions of the mesh component. The mesh component may absorb midfoot and heel strike forces and translate vertical momentum in running into forward momentum through angular-biased mesh components arranged to translate force applied in a desired direction and create angular rotation.

Some embodiments described herein relate to an article of footwear or a footwear component that includes a sole having one or more one solid components and one or more mesh components. As a result, footwear can be customized to provide the sole with mechanical properties that vary across or within different regions and/or that vary depending on the direction in which the midsole is loaded (for example, anisotropic properties) to provide performance improvements. Some embodiments described herein relate to an article of footwear or a footwear component having a mesh component that is additively manufactured. As a result, footwear having custom properties may be produced by controlling the mesh component geometry and dimensions.

As used herein, the term mesh component refers to a three-dimensional structure comprising a plurality of unit cells arranged in a web-like structure or a lattice structure.

The web-like or lattice structure of a mesh component comprises interconnected structural members defining the plurality of unit cells. The structural members, and thus the unit cells, can be connected at nodes. For example, the interconnected structural members can be struts that are connected at nodes and that define unit cells arranged in a lattice configuration. In some embodiments, the plurality of interconnected unit cells can be arranged in a regular or repeating lattice configuration. Exemplary lattice configurations include, but are not limited to basic cubic lattices, body-centered cubic lattices, face-centered cubic lattices, and modified lattices based on these lattice types. Exemplary lattice configurations include, but are not limited to the lattice structures shown in FIGS. 21-28.

Unit cells may have any of various dimensions and geometries. Further, unit cells within a mesh component may be the same or may differ. Thus, a mesh component may include unit cells of different dimensions or geometries. The three-dimensional shape of a unit cell may be defined by a plurality of interconnected struts connected to one another at nodes, as shown for example in FIG. 1. Each unit cell may have a base geometry defined by the struts. As used herein, "base geometry" means the base three-dimensional shape, connection, and arrangement of the struts defining a unit cell. The base geometry of a unit cell may be, but is not limited to, a dodecahedron (e.g., rhombic), a tetrahedron, an icosahedron, a cube, a cuboid, a prism, or a parallelepiped. Each node may connect two or more struts. Struts may be arranged to provide a mesh component with the desired performance characteristics, and a mesh component may include regions with different densities of struts.

In some embodiments, a mesh component may include unit cells composed of sub-cells as described in reference to FIGS. 29A-30B. In some embodiments, a mesh component may include a perimeter structure as described in reference to FIG. 31.

A mesh component may be formed by additive manufacturing (e.g., three-dimensional (3D) printing). For example, a mesh component may be formed using a digital light synthesis (DLS) method. In the DLS process, an ultraviolet (UV) light is selectively applied to a pool of a liquid photopolymer resin to cause a portion of the resin to cure. The product is formed in sections in a layer-by-layer method and once a layer is formed, a new layer of photopolymer resin flows beneath the cured layer and is in turn cured via the UV light until the final product is produced. An oxygen-permeable membrane is arranged beneath the resin so as to form a dead zone to prevent curing of the resin adjacent a window through which the UV light is applied. The DLS process is continuous, which can allow products to be formed with increased speed relative to alternative types of additive manufacturing methods. In some embodiments, other additive manufacturing methods may be used to form the mesh component. The mesh component may be additively manufactured using various materials, including for example an elastomeric polyurethane, among others. In some embodiments, 3-D printing a mesh component can include 3-D printing the mesh in an intermediate green state, shaping the mesh in the green state, and curing the green mesh in its final shape.

Techniques for producing an intermediate object from resins by additive manufacturing are known. Suitable techniques include bottom-up and top-down additive manufacturing, generally known as stereolithography. Such methods are known and described in, for example, U.S. Pat. No. 5,236,637 to Hull, U.S. Pat. Nos. 5,391,072 and 5,529,473 to Lawton, U.S. Pat. No. 7,438,846 to John, U.S. Pat. No. 7,892,474 to Shkolnik, U.S. Pat. No. 8,110,135 to El-Siblani, U.S. Patent Application Publication No. 2013/0292862 to Joyce, and US Patent Application Publication No. 2013/0295212 to Chen et al. The disclosures of these patents and applications are incorporated by reference herein in their entirety.

In some embodiments, the additive manufacturing step is carried out by one of the family of methods sometimes referred to as continuous liquid interface production (CLIP). CLIP is known and described in, for example, U.S. Pat. Nos. 9,211,678; 9,205,601; 9,216,546; and others; in J. Tumbleston et al., Continuous liquid interface production of 3D Objects, *Science* 347, 1349-1352 (2015); and in R. Janusziewcz et al., Layerless fabrication with continuous liquid interface production, *Proc. Natl. Acad. Sci. USA* 113, 11703-11708 (Oct. 18, 2016). Other examples of methods and apparatus for carrying out particular embodiments of CLIP include, but are not limited to: Batchelder et al., US Patent Application Pub. No. US 2017/0129169 (May 11, 2017); Sun and Lichkus, US Patent Application Pub. No. US 2016/0288376 (Oct. 6, 2016); Willis et al., US Patent Application Pub. No. US 2015/0360419 (Dec. 17, 2015); Lin et al., US Patent Application Pub. No. US 2015/0331402 (Nov. 19, 2015); D. Castanon, US Patent Application Pub. No. US 2017/0129167 (May 11, 2017). B. Feller, US Pat App. Pub. No. US 2018/0243976 (published Aug. 30, 2018); M. Panzer and J. Tumbleston, US Pat App Pub. No. US 2018/0126630 (published May 10, 2018); K. Willis and B. Adzima, US Pat App Pub. No. US 2018/0290374 (Oct. 11, 2018) L. Robeson et al., PCT Patent Pub. No. WO 2015/164234 (see also U.S. Pat. Nos. 10,259,171 and 10,434,706); and C. Mirkin et al., PCT Patent Pub. No. WO 2017/210298 (see also US Pat. App. US 2019/0160733). The disclosures of these patents and applications are incorporated by reference herein in their entirety.

While stereolithography techniques such as CLIP can be preferred, it will be appreciated that other additive manufacturing techniques, such as jet printing (see, e.g., U.S. Pat. No. 6,259,962 to Gothait and US Patent App. Serial No. US 2020/0156308 to Ramos et al.) can also be used.

In any of the embodiments described herein, a mesh component may be selected to provide desired performance characteristics. A mesh component may be tailored to provide a higher stiffness to weight ratio to provide a lightweight midsole, to control midsole shear stiffness to allow for or to prevent midsole shear, and to control energy return and damping.

As used herein, the term solid component refers to a component that does not have a web-like or lattice structure. A solid component may be free of openings or voids unless specifically described otherwise in connection with an embodiment herein. A solid component may be formed from a foam material, such as ethylene vinyl acetate (EVA), thermoplastic polyurethane (TPU) or expanded-TPU (e-TPU), a polyether block amide (PEBA), or a combination thereof, among other materials. A solid component may be formed by molding, such as by injection molding, transfer molding, or compression molding, among other molding methods. In embodiments having multiple solid components, each solid component may be formed of the same material or may be formed of different materials depending on the desired properties of a sole.

Figure 2:
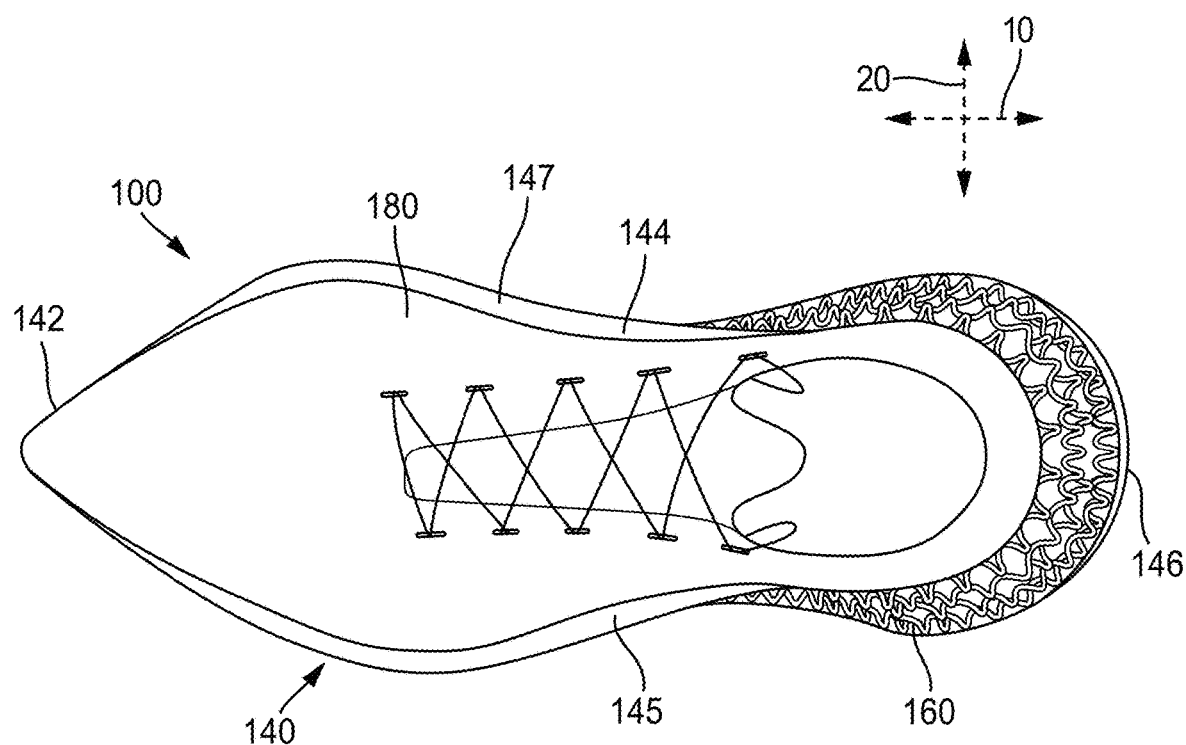
FIG. 2 shows a top-down view of the footwear of FIG. 1.

Some embodiments described herein relate to an article of footwear 100 having a sole 140 that includes at least one solid component 152, 154 and a mesh component 160, and an upper 180 connected to sole 140, as shown in FIGS. 1 and 2. Article of footwear 100 may be a footwear component, such as a sole or a midsole, or may be a complete article of footwear, such as a shoe, sneaker, boot, or cleat, among other types of footwear. Sole 140 may include a toe region 142, a midfoot region 144, and a heel region 146. Sole 140 may include a lower end 141 that is a ground-engaging surface of footwear 100, and an upper end 143 that is connected to upper 180.

A longitudinal direction 10 of a mesh component described herein (e.g., mesh component 160 or 260) extends between a forefoot end and a heel end of the mesh component. Longitudinal direction 10 includes a forward longitudinal direction ("forward direction") extending from the heel end to the forefoot end and a rearward longitudinal direction ("rearward direction") extending from the forefoot end to the heel end. A transverse direction 20 of a mesh component extends between a medial side and a lateral side of the mesh component. Transverse direction 20 of the mesh component includes a medial transverse direction ("medial direction") extending from the lateral side to the medial side and a lateral transverse direction ("lateral direction") extending from the medial side to the lateral side. A vertical direction 30 of a mesh component extends between a top side and a bottom side of the mesh component. Vertical direction 30 includes an upward vertical direction ("upward direction") extending from the bottom side to the top side and a downward vertical direction ("downward direction") extending from the top side to the bottom side. The top side can be considered an "upper-facing side" and the bottom side can be considered a "ground-facing side."

In some embodiments, upper 180 may be a knit upper. A knit upper may be formed by flat knitting or circular knitting. In some embodiments, upper 180 may be a sock-type upper. In some embodiments, upper 180 may include a woven material.

In some embodiments, sole 140 may additionally include an outsole 170. Outsole 170 may be attached to lower end 141 of sole 140 or a portion of lower end 141 of sole 140. In some embodiments, a spacer material may be secured to lower end 141 of sole 140 such that outsole 170 is attached to the spacer material rather than directly to solid component 150 or mesh component 160 of sole 140. Sole 140 may be connected to outsole 170 via any of various methods, such as by stitching, bonding, or by the use of adhesives, among other methods. Outsole 170 may include a durable material, such as a natural or synthetic rubber, among others.

In FIG. 1, sole 140 of footwear 100 includes a first solid component 152 and a second solid component 154. However, in other embodiments, sole 140 may include fewer or additional solid components. In some embodiments, mesh component 160 may be arranged between first solid component 152 and second solid component 154. Mesh component 160 may extend from a medial side 145 to a lateral side 147 of footwear 100. In some embodiments, first and second solid components 152, 154 may be spaced from one another by mesh component 160.

Mesh component 160 may be connected to each of first and second solid components 152, 154. Mesh component 160 may include a plurality of struts 166 connected to one another at nodes 168 as described herein. Struts 166 connected to one another at nodes 168 of mesh component 160 can define a plurality of interconnected unit cells 169 for mesh component 160. In some embodiments, mesh component 160 may extend from lower end 141 of sole 140 to or toward upper end 143 of sole 140. In such embodiments, mesh component 160 may be arranged diagonally on sole 140 at an angle relative to a longitudinal axis of sole 140. For example, in some embodiments, a forefoot end of mesh component 160 may be located at lower end 141 of sole 140 in midfoot region 144 and extend upward and rearward toward upper end 143 of sole 140 such that a heel end of mesh component 160 is located at upper end 143 in heel region 146 of sole 140. In some embodiments, mesh component 160 may be mesh component 260.

In some embodiments, mesh component 160 may be arranged at upper end 143 of sole 140 at heel region 146 and may form a foot-engaging surface at heel region 146 to provide underfoot cushioning. Mesh component 160 at heel region 146 may be shaped to extend around a wearer's heel when footwear 100 is worn.

In some embodiments, first solid component 152 is arranged at toe region 142 of sole 140 and may extend toward midfoot region 144. Mesh component 160 may be arranged at heel region 146 and may extend to or toward midfoot region 144. In some embodiments, second solid component 154 may be arranged at heel region 146 below mesh component 160. In some embodiments, first solid component 152 may be connected to an upper end of mesh component 160 and second solid component 154 may be connected to an opposing lower end of mesh component 160. In such embodiments, second solid component 154 may define all or a portion of the ground-engaging portion of sole 140 at heel region 146, and mesh component 160 may not be a ground-engaging portion at heel region 146. In this way, mesh component 160 may provide cushioning when a wearer's foot contacts the ground, during phases of ground contact while a wearer is walking or running.

In some embodiments, mesh component 160 may have greater energy absorption while solid components 152, 154 may have greater energy return. In some embodiments, mesh component 160 may provide greater longitudinal displacement during running than solid components 152, 154, and the longitudinal displacement during landing serves to lengthen the landing phase of running. Second solid component 154 may provide a soft landing for a runner wearing footwear 100 and may provide a smooth transition.

Mesh component 160 may be connected to first and second solid components 152, 154 by any of various fastening methods, such as by epoxy, glue, or other adhesives. In some embodiments, mesh component 160 may be connected to first and second solid components 152, 154 by radiofrequency welding, friction fit, or by placing the preformed mesh component 160 in the mold or molds used to form first and second solid components 152, 154. In some embodiments, mesh component 160 may include a bonding flange (for example, bonding flange 265) to provide a surface for bonding mesh component 160 to solid components 152, 154. First solid component 152 may be connected to a first surface 161 (e.g., an upper-facing surface) of mesh component 160, and second solid component 154 may be connected to a second surface 162 (e.g., a ground-facing surface) of mesh component 160 opposite first surface 161.

In some embodiments, a portion 163 of mesh component 160 may overlap with a portion 182 of upper 180 of footwear 100, as shown in FIG. 1. Portion 182 of mesh component 160 may overlap with portion 182 of upper 180 arranged at a heel region of footwear 100. Overlap of mesh component 160 and upper 180 may help to facilitate securement of mesh component 160, and sole 140, to upper 180. In some embodiments, mesh component 160 may be directly secured to upper 180 via bonding, as known by one of ordinary skill in the art. In some embodiments, an upper may be directly secured to a bonding flange 265 of mesh component 260 as shown for example in FIG. 5B. In some embodiments, upper may be welded to mesh component 160, such as by high-frequency (HF) or infrared (IR) welding.

Figure 3:
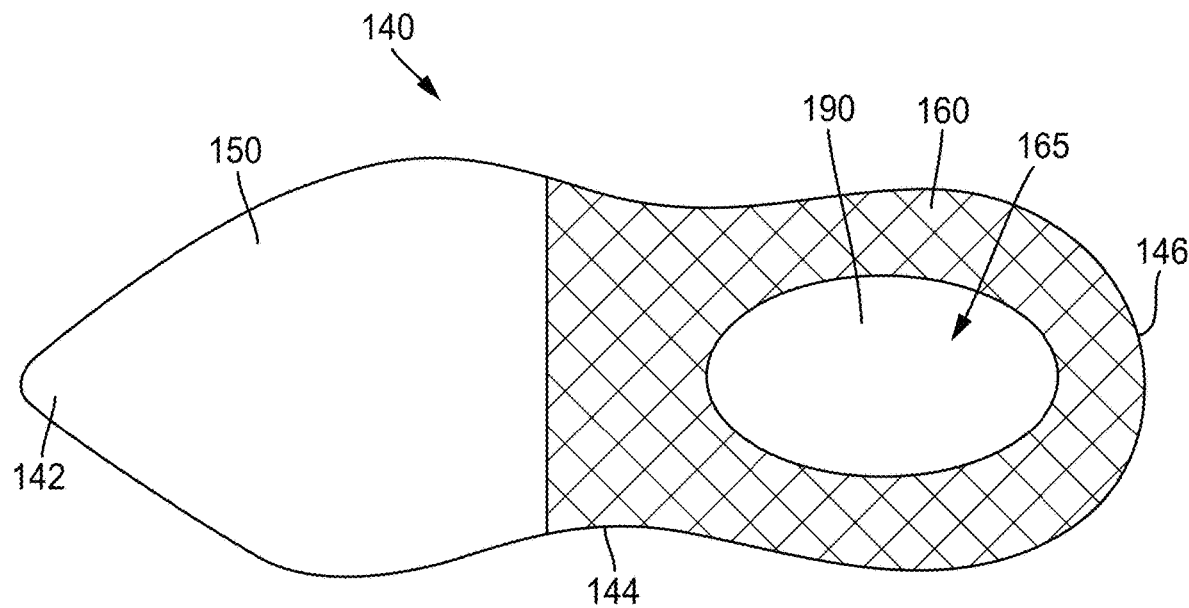
FIG. 3 shows a top-down view of a sole having a cavity according to some embodiments.

In some embodiments mesh component 160 of sole 140 may define a cavity 165, as shown for example in FIG. 3. While mesh component 160 includes open space, such as space between struts or within unit cells, such open spaces are not a cavity as the term is used herein. Instead, a cavity is formed by an absence of struts or unit cells at an area of mesh component that would otherwise include struts or unit cells. In some embodiments, cavity 165 may be empty so as to form an open space in sole 140. This may provide mesh component 160 and sole 140 with increased flexibility and may serve to reduce the weight of mesh component 160, which also reduces the overall weight of footwear 100. Cavity 165 may be fully enclosed by mesh component 160 so as to be an internal cavity surrounded by unit cells of mesh component 160, or cavity 165 may be open at a portion of mesh component 160, such as at an upper end 143 of sole 140. In some embodiments, cavity 165 may be arranged at a midfoot region 144, a heel region 146, a toe region 142, or at a location between two regions. In some embodiments, mesh component 160 may define multiple cavities 165.

In some embodiments, an insert 190 may be arranged within cavity 165, as shown in FIG. 3. Insert 190 may be, for example, a foam insert. In some embodiments, insert 190 may be formed from a material used to form first solid component 152 or second solid component 154. In some embodiments, insert 190 may be a bladder, for example an air-filled or fluid-filled bladder. Insert 190 may be selected to provide footwear with the desired performance attributes, such as improved stiffness, cushioning, shock-absorption, rebound, weight distribution, and the like.

Figure 4:
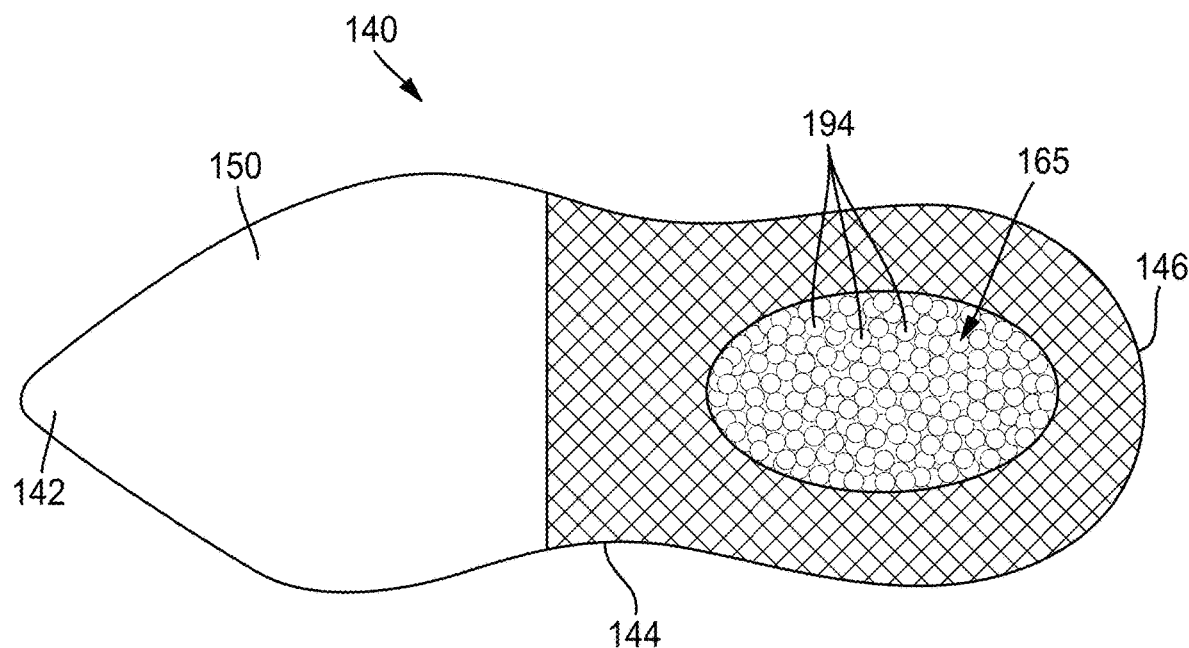
FIG. 4 shows a top-down view of the sole of FIG. 3 with particles arranged in the cavity according to some embodiments.

In some embodiments, cavity 165 of mesh component 160 may be filled with particles 194, as shown for example in FIG. 4. Particles 194 may have a diameter that is greater than a maximum dimension the space between struts in mesh component 160. In some embodiments, particles 194 may have a maximum diameter measured as a greatest dimension of each particle in a range of 2 mm to 20 mm, 3 mm to 16 mm, or 6 mm to 12 mm. In this way, particles 194 are bound by mesh component 160 and may not escape from mesh component 160 to an exterior of sole 140. Particles 194 may be formed from a foam material, for example EVA (ethylene-vinyl acetate), PU (polyurethane), TPU (thermoplastic polyurethane), or PEBA (polyether block amide). In some embodiments, particles 194 may be formed of a material used to form solid components 150. Cavity 165 may be partially filled with particles 194 or may be substantially filled with particles 194, depending upon the desired mechanical properties and performance characteristics of sole 140. In some embodiments, particles 194 may fill at least about 50% of a volume of cavity 165.

Figure 5A:
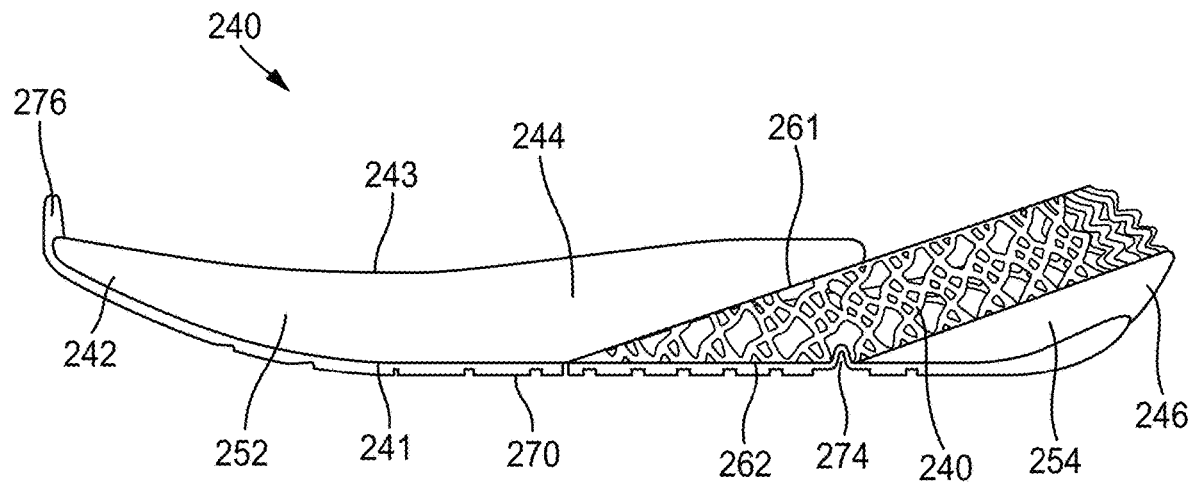
FIG. 5A shows a side view of a sole having a mesh component according to some embodiments.
Figure 5B:
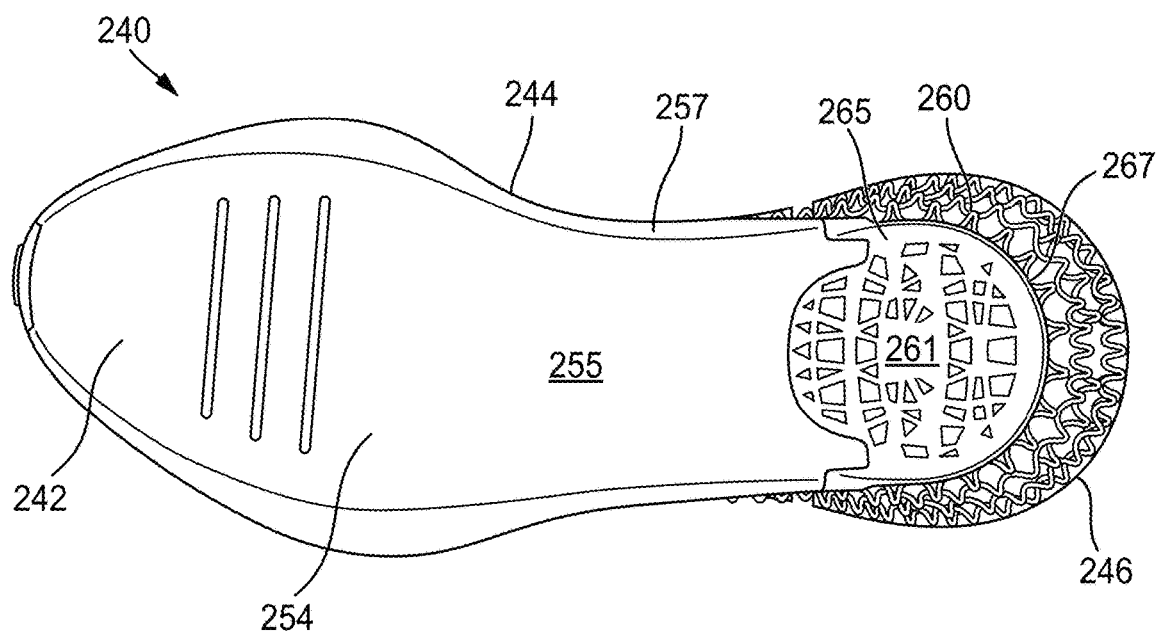
FIG. 5B shows a top-down view of the sole of FIG. 5A.
Figure 5C:
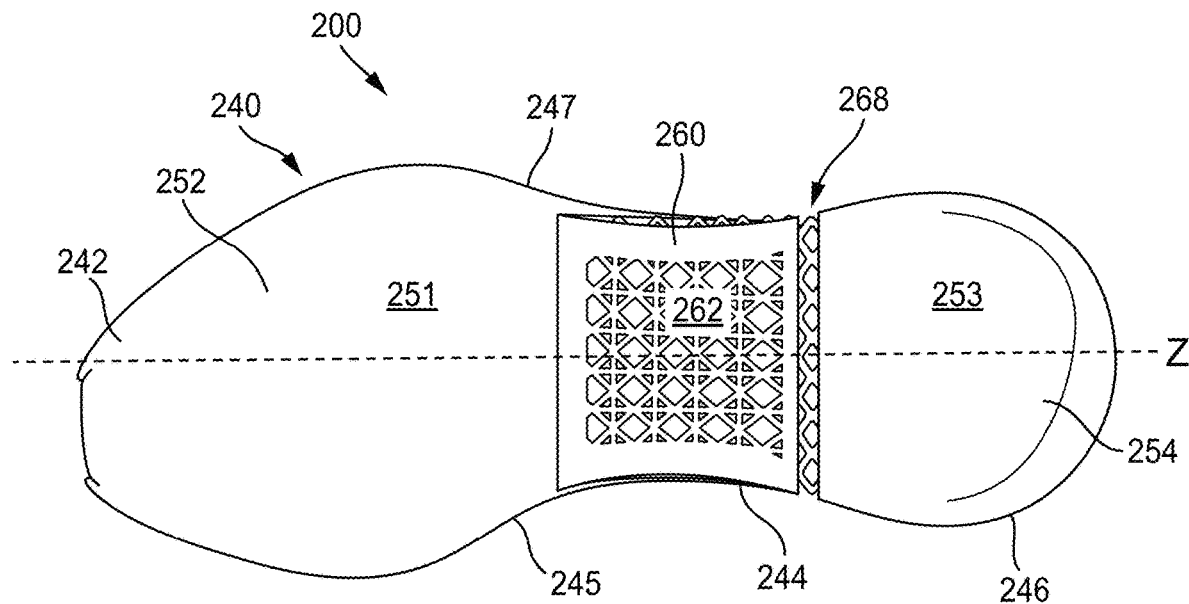
FIG. 5C shows a bottom view of the sole of FIG. 5A.

In some embodiments, sole 140 may be a sole 240 as shown in FIGS. 5A-5C including a first solid component 252, a second solid component 254, and a mesh component 260. First and second solid components 252, 254 may be constructed and arranged in the same manner as described above with respect to sole 140. Sole 240 includes mesh component 260 having a channel 268 extending from a medial side 245 to a lateral side 247 of sole 240. Channel 268 may extend in a direction transverse to a longitudinal axis Z of footwear 200, as best shown in FIG. 5C. Channel 268 may be arranged at or adjacent bottom surface 262 of mesh component 360 so that mesh component 260 may bend or flex at channel 268. In such embodiments, channel 268 may define an opening in bottom surface 262 that creates a gap between mesh component 260 and second solid component 254 at bottom surface 262.

While mesh component 260 includes open space, such as space between struts or within unit cells, such open spaces are not a channel as the term is used herein. Instead, a channel is formed by an absence of struts or unit cells at an area of mesh component that would otherwise include struts or unit cells.

The top surface of the sole 240 may include a top surface 255 of the first solid component 252 at the toe region 242 and midfoot region 244, and a top surface 261 of mesh component 260 at heel region 246. First solid component 252 may define a rim 257 that circulates around an upper perimeter of sole 240, and mesh component 260 may similarly define a rim 267 at heel region 246 and that aligns with rim 257 of first solid component 252. Bottom surface of sole 240 may include a bottom surface 251 of first solid component 252, a bottom surface 262 of mesh component 260, and a bottom surface 253 of second solid component 254, as shown in FIG. 5C. In embodiments where channel 268 defines an opening in bottom surface 262, channel 268 creates a gap between bottom surface 262 of mesh component 260 and a bottom surface 253 of second solid component 254.

Figure 6:
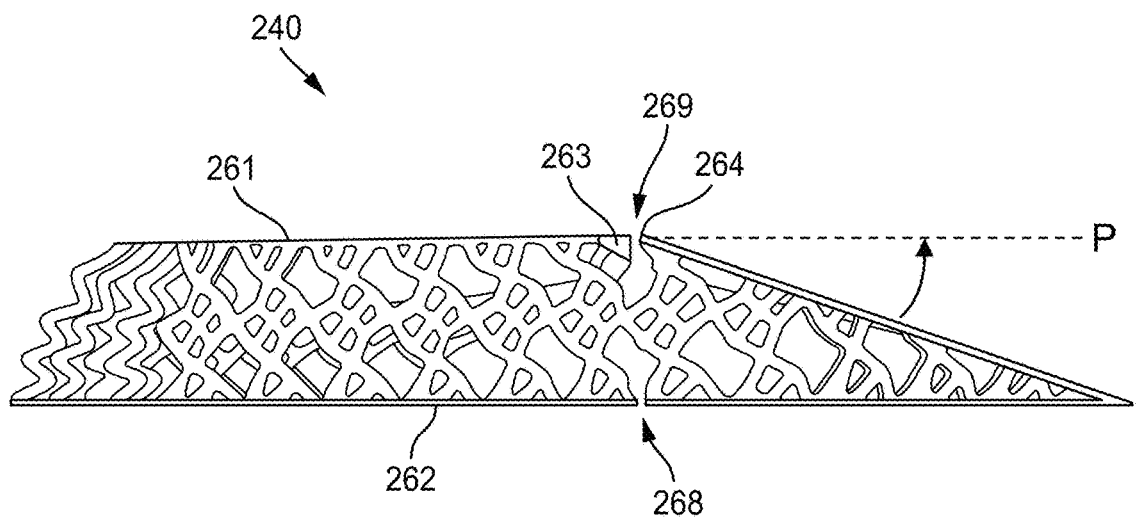
FIG. 6 shows a side view of a mesh component for use in the sole of FIG. 5A.

In some embodiments, mesh component 260 having a channel 268 may be manufactured via additive manufacturing so that bottom surface 262 of mesh component 260 is substantially flat or planar, as shown in FIG. 6. Once manufacturing is complete, mesh component 260 may be bent at channel 268 to a final shape, such that bottom surface 262 of mesh component 260 is not planar. Mesh component 260 may be bent so that top surface 261 of mesh component 260 is planar, and is arranged along plane P in FIG. 6. To facilitate bending of mesh component 260, top surface 261 of mesh component 260 may include a channel 269. Channel 269 may extend from medial side 245 to lateral side 247 of mesh component 260. In some embodiments, channel 269 may be parallel to channel 268 of top surface 261. In embodiments, including channel 269, top surface 261 of mesh component 260 may define a notch 263 for receiving a protrusion 264 when mesh component 260 is bent. Notch 263 and protrusion 264 may be arranged on opposing sides of channel 269 so that when mesh component 260 is bent into the final shape, protrusion 264 moves towards and engages with notch 263, closing channel 269. Mesh component 260 in its final shape may then treated to maintain the bent configuration of mesh component 260. For example, mesh component may be baked on an angled tray to maintain the bent configuration of mesh component 260.

In some embodiments, an outsole 270 may be secured to sole 240, and to bottom surface 262 of mesh component 260, to cover channel 268. This may help to prevent external objects from becoming lodged within channel 268. Outsole 270 may include a recessed groove 274 that is aligned with channel 268 of mesh component 260. In some embodiments, recessed groove 274 of outsole 270 may be disposed in channel 268. Recessed groove 274 of outsole 270 may serve as an expansion joint to allow for longitudinal deflection of mesh component 260 while limiting the stretch of mesh component 260.

Figure 7:
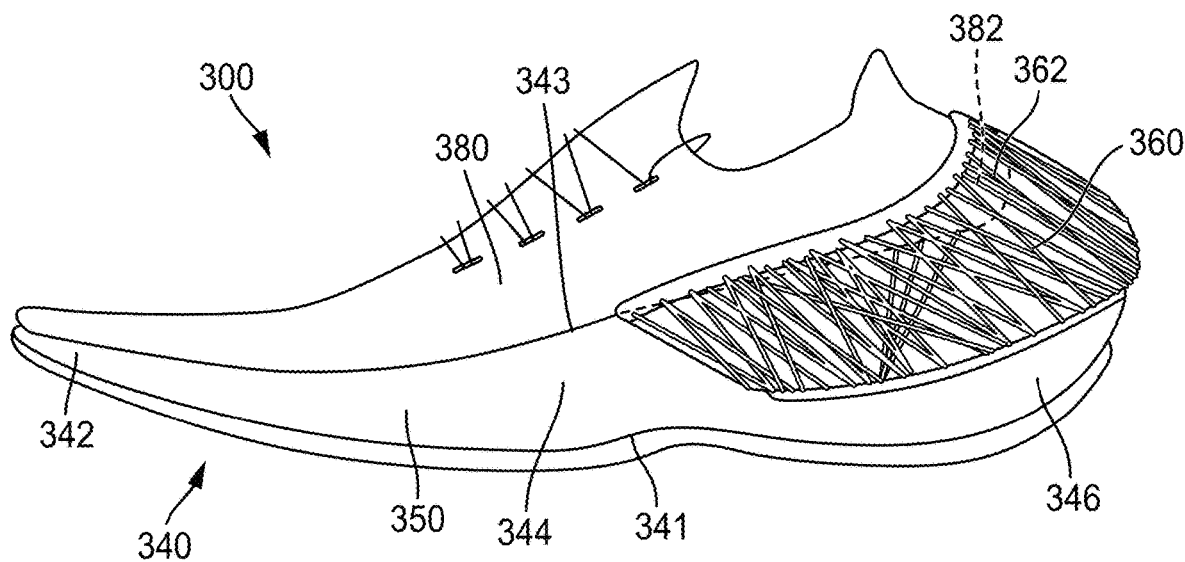
FIG. 7 shows a side view of footwear having a sole with a mesh component according to some embodiments.
Figure 8:
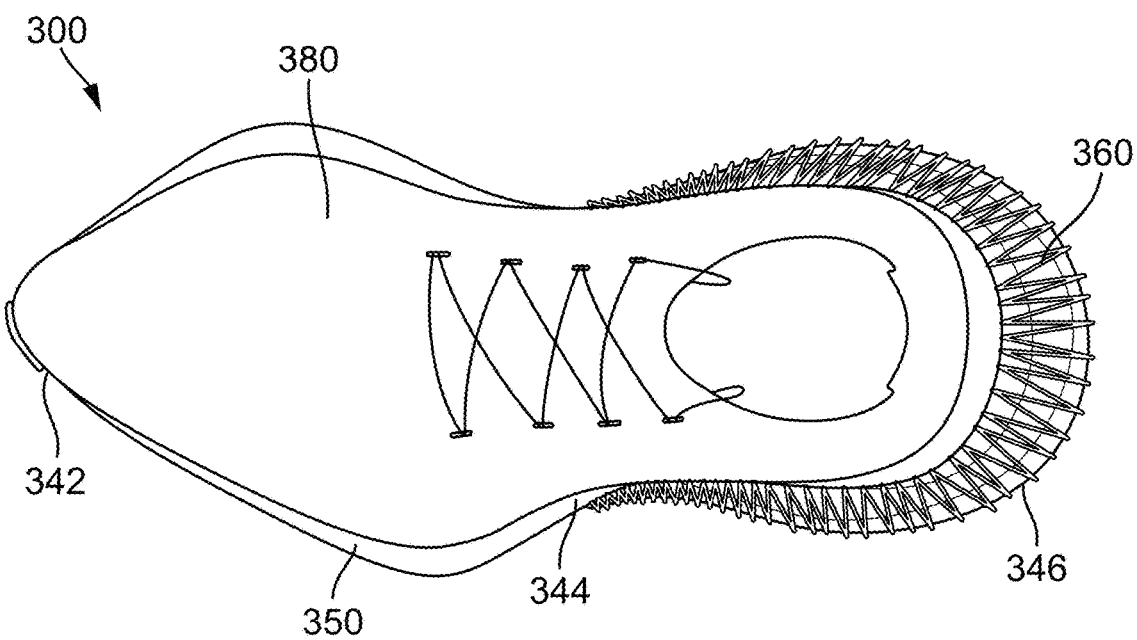
FIG. 8 shows a top down view of the footwear of FIG. 7.

In some embodiments, an article of footwear 300 may include a mesh component 360, as shown in FIGS. 7 and 8. Footwear 300 is similar to footwear 100 and includes a sole 340 and an upper 380. Sole 340 includes a toe region 342, a midfoot region 344, and a heel region 346. Sole 340 further includes a lower end 341 that is a ground-engaging surface, and an upper end 343 connected to upper 380. Footwear 300 differs from footwear 100 in a construction of sole 340. Sole 340 includes a single solid component 350 and a mesh component 360. Solid component 350 may extend from toe region 342 to or toward heel region 346. Solid component 350 may be the ground-engaging surface of sole 340. Mesh component 360 may be arranged on and connected to upper end 343 of solid component 350, such as at heel region 346. Mesh component 360 may form an upper surface of sole 340 at heel region 346. Mesh component 360 and may alternatively or additionally extend around a portion of a perimeter of solid component 350. Particularly, mesh component 360 may extend from solid component 350 around heel region 346 and toward lateral and medial sides of sole 340 at midfoot region 344. In some embodiments, a portion 362 of mesh component 360 may overlap with a portion 382 of upper 380. The overlapping portions 362, 382 may be at a heel region 346. Overlapping portions 362, 382 may facilitate secure connection of mesh component 360 to upper 380.

Figure 9:
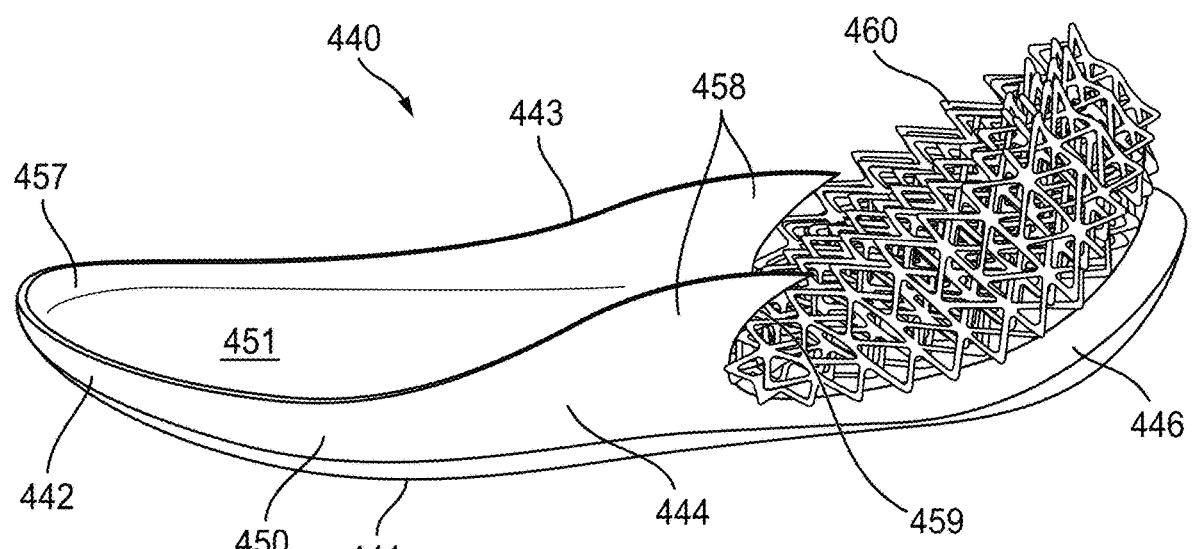
FIG. 9 shows a perspective view of a sole having a mesh component according to some embodiments.

Similar to sole 340 of FIGS. 7 and 8, sole 440 may include a solid component 450 and a mesh component 460, as shown in FIG. 9. Sole 440 may include a toe region 442, a midfoot region 444, and a heel region 446. Solid component 450 may extend from toe region 442 to heel region 446, and mesh component 360 may be arranged on upper end of sole 440 at heel region 446. Upper surface 451 of solid component 450 may define a foot-engaging surface of sole 440. However, sole 440 differs in that it includes a lip 457 extending around at least a portion of a perimeter of sole 440 at upper surface 451. In some embodiments, lip 457 may extend around an entire perimeter of sole 440. Lip 457 may extend around toe region 442 and toward midfoot region 444 on both lateral and medial sides of sole 440. Further, lip 457 may increase in height from toe region 442 toward midfoot region 444 so as to form an upstanding fin 458 on opposing medial side and lateral sides of sole 440. Fin 458 may form a concave portion 459. Mesh component 460 may be connected to a perimeter of solid component 450 of sole 440 at a heel region 446 of sole 440. Mesh component 460 may extend around heel region 446 and toward midfoot region 444 and connect to fins 458, and particularly to concave portions 459 of fins 458 at lateral and medial sides of midfoot region 444 to create a smooth and continuous transition from solid component 450 to mesh component 460.

Figure 10:
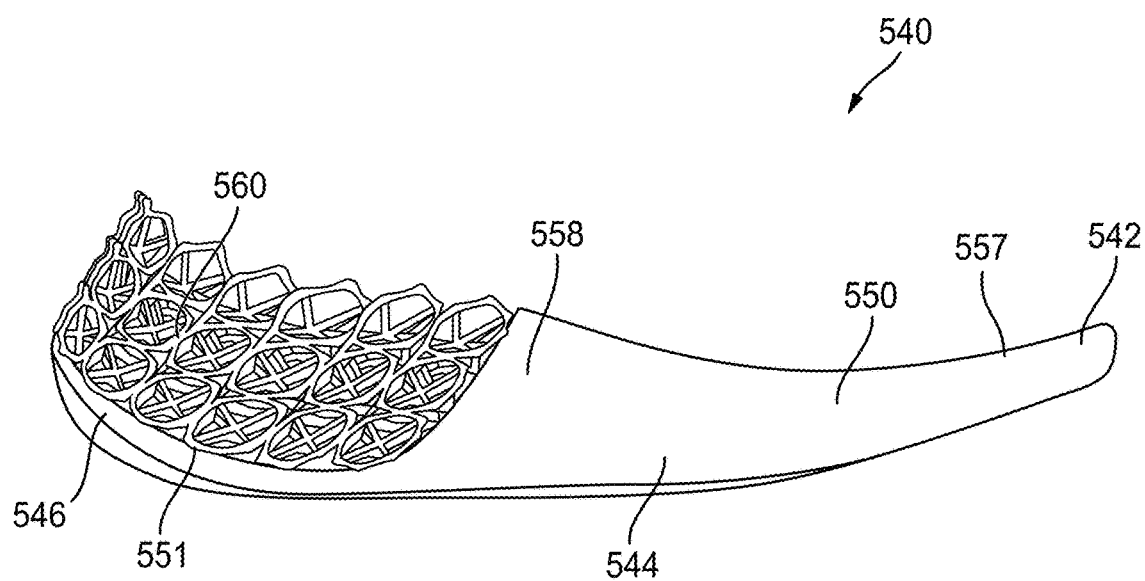
FIG. 10 shows a side view of a sole having a mesh component according to some embodiments.

Sole 540 as shown in FIG. 10 is similar to sole 440 of FIG. 9 and includes a solid component 550 that extends from toe region 542, to midfoot region 544, and to heel region 546. Mesh component 560 may be arranged on upper end 551 of solid component 550 at heel region 546. Solid component 550 may be the ground-engaging portion of sole 540, or in some embodiments, an outsole may be applied to lower end 541 of sole 540. Sole 540 may include a lip 557 extending around at least a portion of a perimeter of sole 540. Lip 557 may increase in height from toe region 542 to midfoot region 544 to form a fin 558. Fin 558 may slope from midfoot region 544 toward heel region 546. Fin 558 may have a generally triangular shape. Mesh component 560 may be connected to fin 558 at medial and lateral sides of midfoot region 544 and may extend around heel region 546 to create a smooth and continuous transition from solid component 550 to mesh component 560.

Figure 11:
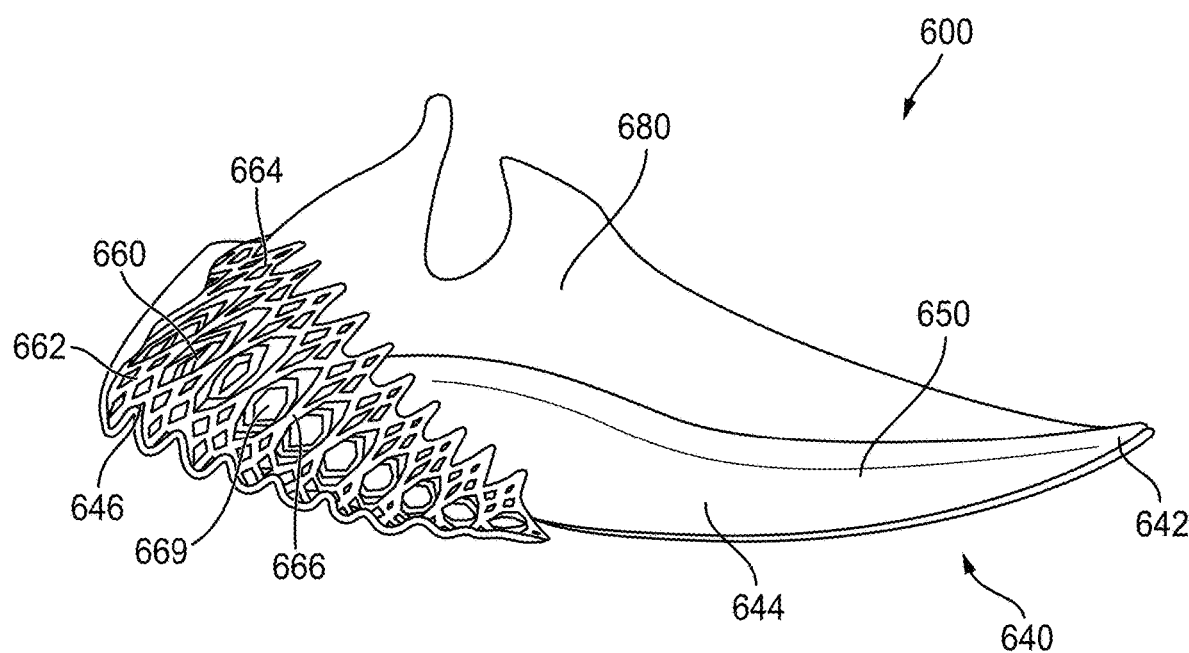
FIG. 11 shows a side view of footwear having a sole with a mesh component according to some embodiments.

Footwear 600 may include a sole 640 having a solid component 650 and a mesh component 660 as shown in FIG. 11. Footwear 600 includes a sole 640 connected to an upper 680. Sole 640 includes a toe region 642, a midfoot region 644, and a heel region 646. Sole 640 differs from soles 440, 540 in that solid component 650 does not include a heel portion located below mesh component 660 at heel region 646. Solid component 650 may extend from toe region 642 to midfoot region 644. Mesh component 660 may be connected to solid component 650 at midfoot region 644 and may be arranged at heel region 646. A portion of upper end 664 of mesh component 660 may be connected to solid component 650 and a second portion of mesh component 660 may be connected to upper 680. In some embodiments, lower end 662 of mesh component 660 may be a ground-engaging portion of sole 640 at heel region 646. In some embodiments, sole 640 may include an outsole coupled to lower end 662 of mesh component 660 and defining a ground-engaging portion of sole 640 at heel region 646

Mesh component 660 of sole 640 may increase in height from midfoot region 644 toward heel region 646. Mesh component 660 may have a triangular or wedge-like shape when footwear 600 is viewed from the side, as shown in FIG. 11. Mesh component 660 may include a plurality of struts 666 extending between lower end 662 and upper end 664. Struts 666 may form a web-like pattern, such that upper end 664 and lower end 662 of mesh component 660 are relatively dense in comparison to a midportion of mesh component 660 having struts 666. Struts 666 extend between upper end 664 and lower end 662 and define through-openings 669 in mesh component 660. Struts 666 may increase in length from midfoot region 644 toward heel region 646, and similarly the size or diameter of through-openings 669 may increase from midfoot region 644 toward heel region 646.

In some embodiments, a mesh component as described herein, such as mesh component 660, may have a stiffness gradient. Stiffness of a mesh component may increase from heel region toward midfoot region. During touchdown of a wearer's foot when running, the stiffness gradient may promote the foot moving forward into the stiffer region of the mesh component.

Figure 12:
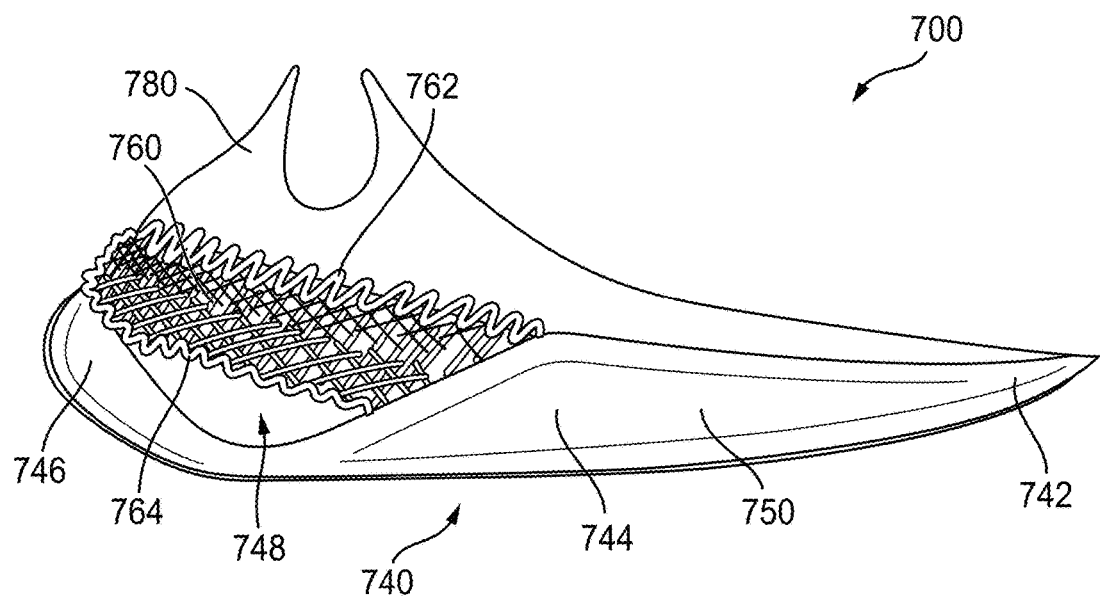
FIG. 12 shows a side view of footwear having a sole with a mesh component according to some embodiments.

In some embodiments, footwear 700 may include a sole 740 having a recess 748, as shown in FIG. 12. Footwear 700 includes a sole 740 connected to an upper 780. Sole 740 includes a toe region 742, a midfoot region 744, and a heel region 746. Sole 740 further includes a solid component 750 that extends from toe region 742 to heel region 746. Solid component 750 may be a ground-engaging surface of sole 740. Solid component 750 may define a recess 748 in sole 740. Recess 748 may be located at midfoot region 744, heel region 746, or at a location between midfoot region 744 and heel region 746. Recess 748 may extend in a direction transverse to a longitudinal axis of footwear 700 such that it extends from a medial side to a lateral side of footwear 700. Mesh component 760 may extend across recess 748 from solid component 750 at midfoot region 744 to solid component 750 at heel region 746. Upper end 762 of mesh component 760 may be connected to upper 780, and a portion of lower end 764 of mesh component 760 may be separated from solid component 750 by recess 748. Mesh component 760 may be arranged between upper 780 and solid component 750.

When footwear 700 is worn, a wearer's foot is supported on solid component 750 at toe region 742 and midfoot region 744, and on mesh component 760 at heel region 746. When the wearer's foot flexes, such as when the wearer pushes off of the ground when walking or running, mesh component 760 may bend or flex into recess 748, as shown in FIG. 12. This may provide improved suspension and reduction of transfer of ground-strike forces to a wearer's foot, and may provide improved rebound or spring during the lift-off or propulsive stage of walking or running. Higher deformation distance when compressed will result in a greater cushioning for the wearer. Further, greater energy return may be provided which can improve running efficiency. The recess 748 may also help to reduce the overall weight of sole 740 and of footwear 700, which may improve running economy.

When footwear 700 is at rest, as shown for example in FIG. 12, lower end 764 of mesh component 760 may include a portion suspended within recess 748. Portion of lower end 764 of mesh component 760 suspended within recess 748 is disposed above and separated from a surface of solid component 750 defining recess 748. The separation between the portion of lower end 764 of mesh component 760 suspended within recess 748 and a surface of sole 740 defining recess 748 may create a void in sole 740. In some embodiments, the void may be an open space in sole 740. In some embodiments, the void may be fully or partially filled with a support element. Exemplary support elements include, but are not limited to, a solid foam element, a bladder, an additively manufactured component that includes a material different than the mesh component 760, a cast or injected elastomeric component to fill the void and provide cushioning.

Figure 13:
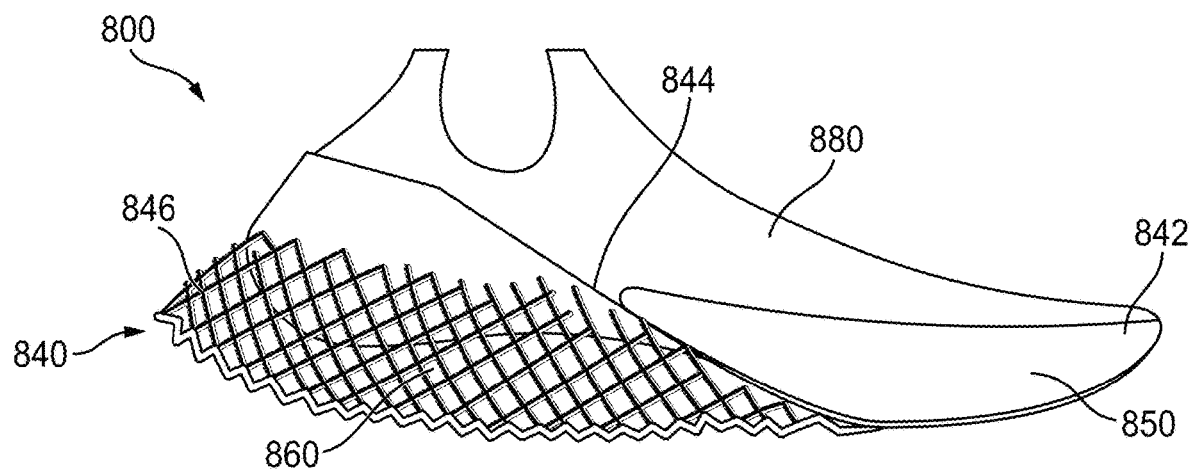
FIG. 13 shows a side view of footwear having a sole with a mesh component according to some embodiments.

In some embodiments, footwear 800 may include a sole 840 that includes a solid component 850 and a mesh component 860, as shown in FIG. 13. Solid component 850 may be arranged at toe region 842 of sole 840 and may extend toward midfoot region 844. Mesh component 860 may be arranged at a heel region 846 of sole 840, and may extend toward midfoot region 844 of sole 840. Mesh component 860 may serve as a foot-engaging portion of footwear 800 at heel region 846. In some embodiments, a wearer's foot may rest on or contact mesh component 860 at heel region 846. Solid component 850 may be connected to mesh component 860 at midfoot region 844 and may be connected to upper 880 at heel region 846. Mesh component 860 may extend onto upper 880 so as to overlap with at least a portion of upper 880 at heel region 846. Mesh component 860 may provide a smooth transition to upper 880 of footwear 800. Similar to footwear 700 of FIG. 12, mesh component 860 of sole 840 may define a cavity. However, in FIG. 13, cavity may extend in a longitudinal direction of footwear 800. Mesh component 860 may bend or flex into the recess when the wearer pushes off of the ground when walking or running.

Figure 14:
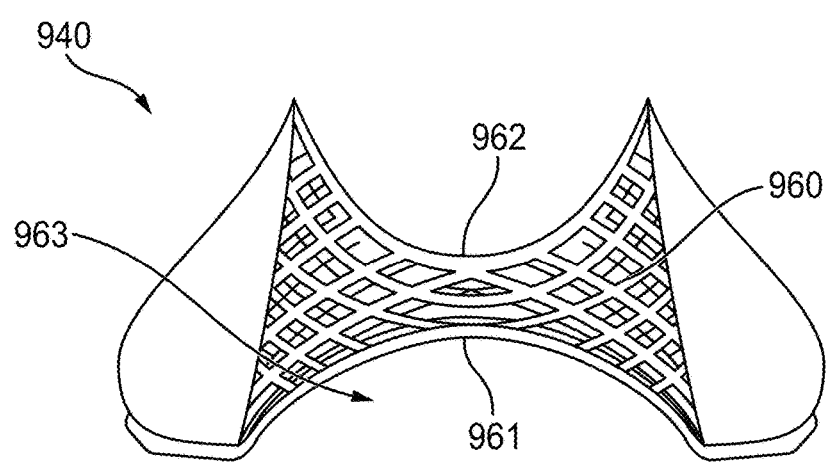
FIG. 14 shows a rear view of a sole having a mesh component according to some embodiments.

In some embodiments, sole 940 may include a mesh component 960 and a solid component, as shown in FIG. 14. Sole 940 includes a mesh component 960 having an arched lower end 961. Arched lower end 961 may create an empty area 963 below sole 940 to maximize displacement of a wearer's foot when footwear incorporating sole 940 is worn and used for walking or running. Further, the arched shape of sole 940 reduces the amount of material required to form sole 940, reducing manufacturing costs and reducing weight of sole 940 relative to a sole 940 having area 963 below arched lower end 961 filled with material. Sole 940 may have a concave curvature when viewed from the heel of footwear, such that the arch extends from a medial side to a lateral side of footwear. Mesh component 960 may further include a curved upper end 962 that forms a foot-engaging surface of sole 940. Upper end 962 may have a concave curvature for receiving a heel of a wearer's foot.

Figure 15:
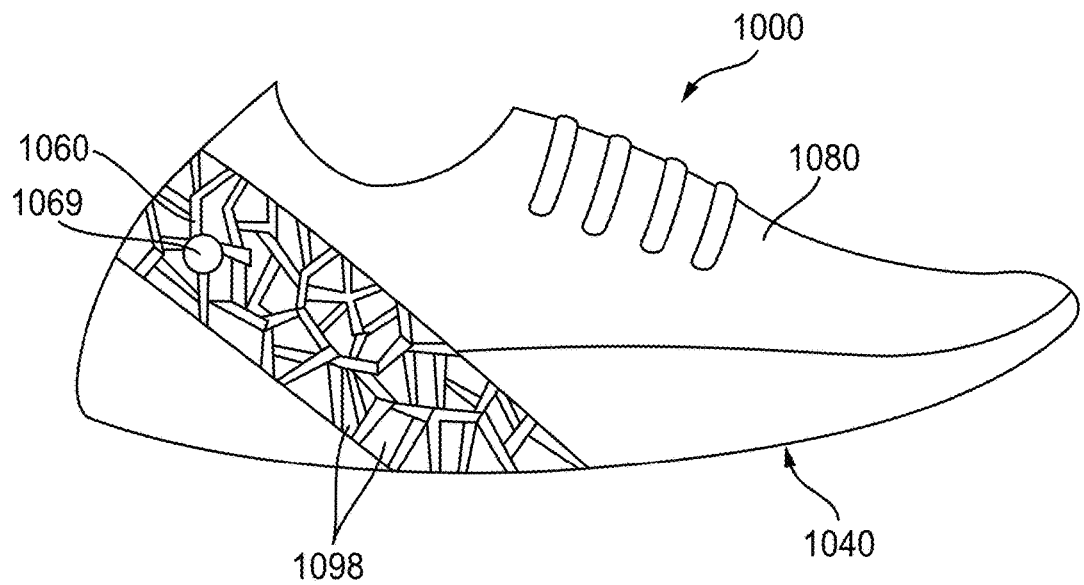
FIG. 15 shows a side view of an article of footwear having a mesh component that includes a filler material according to some embodiments.

Some embodiments described herein relate to footwear 1000 having a mesh component 1060 that is filled with a filler material, as shown for example in FIG. 15. Footwear 1000 may include a sole 1040 and an upper 1080 as described herein with respect to any of sole 140, 240, 340, 440, 540, 640, 740, 840, or 940. Unit cells of mesh component 1060 may be filled with a filler material 1098, such as a foam material. Filler material 1098 may be for example EVA, TPU, PEBA, or a combination thereof, among other materials. Filler material 1098 may be selected so as to provide sole 1040 with the desired mechanical properties and performance characteristics. Thus, open space within mesh component 1060, e.g., the open space between struts, may be at least partially filled with filler material 1098.

In some embodiments, filler material 1098 may be injected into an additively manufactured mesh component 1060. In some embodiments, mesh component 1060 may include a port 1069 to facilitate injection of filler material 1098 into mesh component 1060. Port 1069 may include a tube or channel that extends into mesh component 1060 to facilitate distribution of filler material 1098 throughout mesh component 1060. Port 1069 may be connected to a plurality of struts of mesh component 1060. In some embodiments, port 1069 may be a separate piece attached to mesh component 1060. In such embodiments, mesh component 1060 may be formed with a cavity configured to receive all or a portion of a port 1069. In some embodiments, however, port 1069 may be integrally formed with mesh component 1060. For example, port 1069 may be formed during an additive manufacturing process used to make mesh component.

Figure 16A:
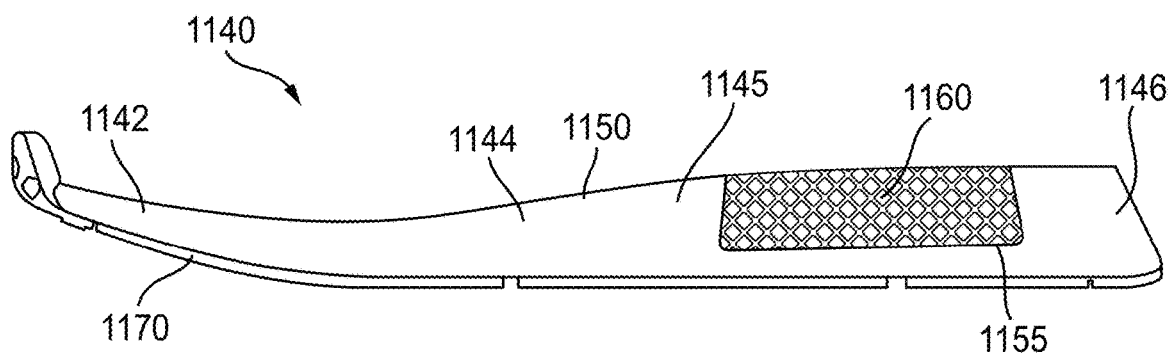
FIG. 16A shows a medial side view of a sole having a mesh component according to some embodiments.
Figure 16B:
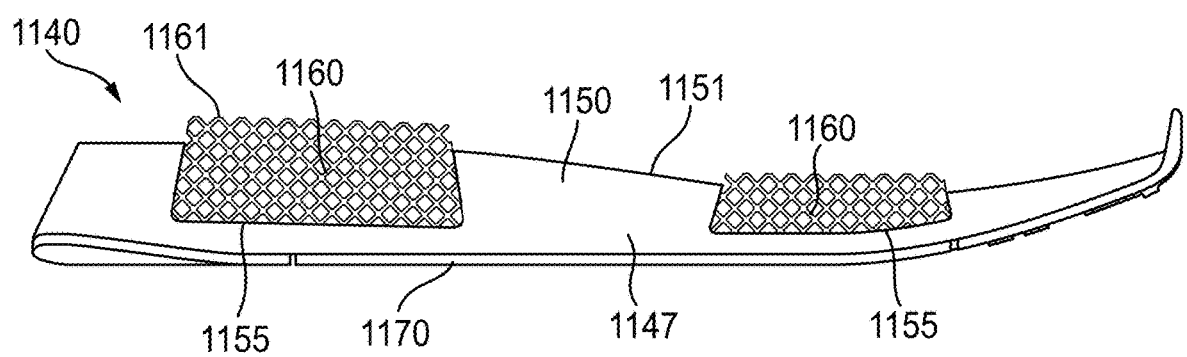
FIG. 16B shows a lateral side view of the sole of FIG. 16A.

In some embodiments as shown in FIGS. 16A and 16B, sole 1140 may include a single solid component 1150 extending from toe region 1142 to heel region 1146. Solid component 1150 may be foot-shaped so as to support the wearer's foot from toe region 1142 to heel region 1146. Solid component 1150 may include one or more recesses 1155 for receiving a mesh component 1160. In some embodiments, a recess 1155 may be formed in and along a medial side 1145 or sole 1140. In some embodiments, a recess 1155 may be formed in and along a lateral side 1147 of sole 1140. A recess 1155 may be arranged at a toe region 1142, a midfoot region 1144, or a heel region 1146, or a combination thereof. In some embodiments, recess 1155 may have a square or rectangular configuration when sole 1140 is viewed in a top-down manner. Each recess 1155 may receive a mesh component 1160. Mesh component 1160 may be sized and shaped to fill recess 1155. Mesh component 1160 may be a square or rectangular block. In some embodiments, mesh component 1160 may be sized and shaped to fill recess 1155 and extend from recess 1155. In some embodiments, an upper end 1161 of mesh component 1160 may be flush with upper surface 1151 of solid component 1150 so that sole 1140 has a continuous upper surface. However, in some embodiments, as shown in FIG. 16B, an upper end 1161 of a mesh component 1160 may be sized and shaped to extend upward and above an upper surface 1151 of solid component 1150 of sole 1140.

Figure 17:
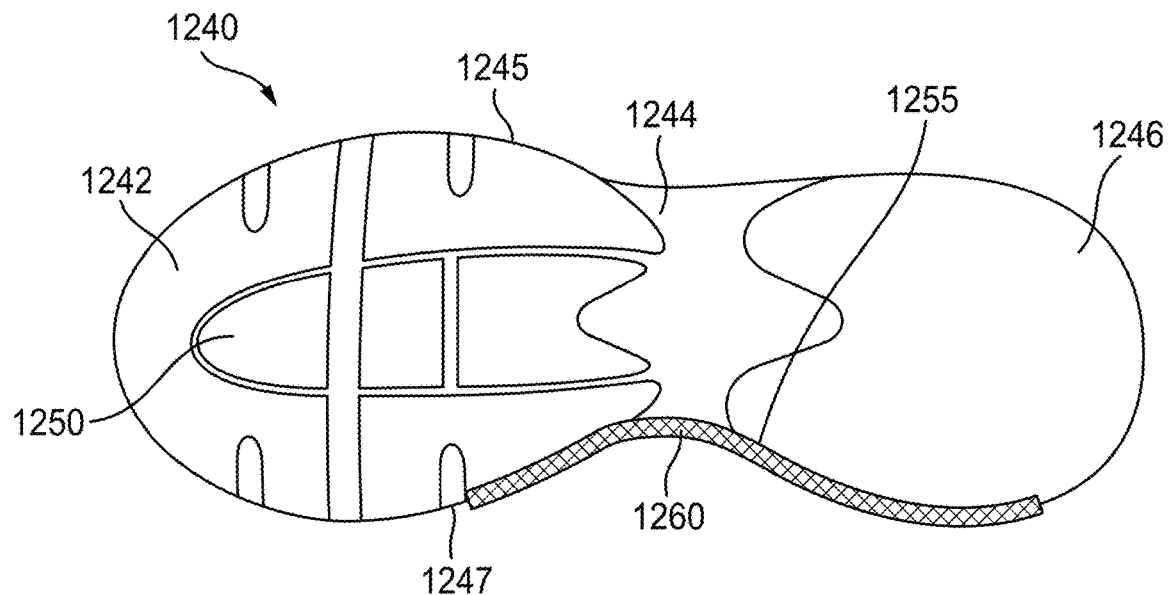
FIG. 17 shows a bottom view of a sole according to some embodiments.

Similar to sole 1140 of FIGS. 16A and 16B, solid component 1250 of sole 1240 of FIG. 17 may include a recess 1255 for receiving a mesh component 1260. However, in FIG. 16, recess 1255 of sole 1420 may be arranged along only a lateral side 1245 or a medial side 1247 of sole 1240. Recess 1255 may extend along a perimeter of sole 1240 from toe region 1242 to or toward midfoot region 1244, and may further extend to or toward heel region 1246. Mesh component 1260 may be arranged in recess 1255 so as to extend along a perimeter of sole 1240. Mesh component 1260 may be a thin, elongated strip. Mesh component 1260 may support sidewall of sole 1240 to provide stiffness to enhance motion control or prevent over-pronation, among other things.

Figure 18:
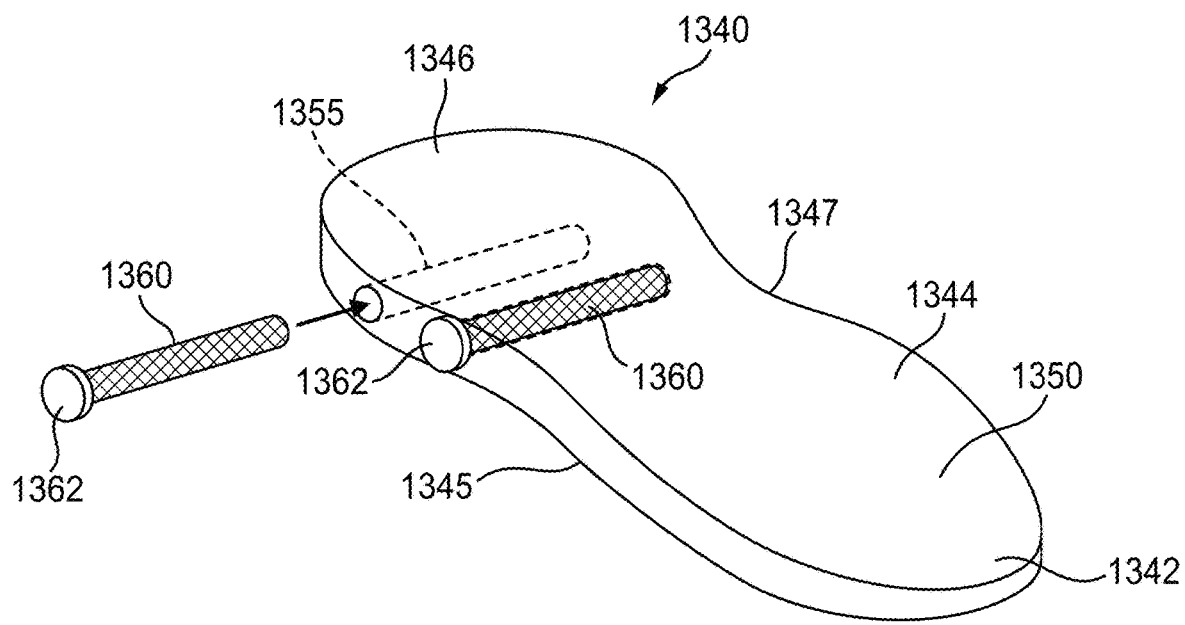
FIG. 18 shows a perspective view of a sole having a mesh component according to some embodiments.

In some embodiments, as shown in FIG. 18, sole 1340 may include a solid component 1350 and a mesh component

1360. In some embodiments, similar to sole 1140 of FIGS. 16A and 16B, sole 1340 may include a solid component 1350 extending from toe region 1342 to heel region 1346, and may be foot-shaped to support the wearer's foot from toe region 1142 to heel region 1146. In some embodiments, solid component 1350 may define a portion of sole 1340, for example, solid component 1350 may define all or a portion of toe region 1342, a midfoot region 1344, and heel region 1346.

Solid component 1350 may include a sidewall cavity 1355 configured to receive a mesh component 1360. For example, as shown in FIG. 18, sidewall cavity 1355 may extend through solid component 1350 in a transverse direction of sole 1340. Sidewall cavity 1355 may be formed in and extend from medial side 1345 to or toward lateral side 1347, or vice versa. Sidewall cavity 1355 may be located in heel region 1346 of sole 1340, or may be located at various locations within sole 1340.

Sidewall cavity 1355 may have a cross sectional area corresponding to the cross sectional area of a mesh component 1360 such that mesh component 1360. For example, in some embodiments, sidewall cavity 1355 can have a circular cross sectional area to receive a cylindrical or tubular mesh component 1360. In some embodiments, solid component 1350 of sole 1340 includes multiple sidewall cavities 1355. In some embodiments, each sidewall cavity 1355 may have a cross sectional area corresponding to the cross sectional area of a mesh component 1360. In some embodiments, each sidewall cavity 1355 may have a circular cross sectional area to receive a cylindrical or tubular mesh component 1360.

In some embodiments, mesh component 1360 may be removably securable within sidewall cavity 1355 of solid component 1350 so that mesh component 1360 may be interchanged by the consumer or by the manufacturer to provide a sole 1340 with desired performance characteristics. Alternatively, one or more sidewall cavities 1355 may remain empty, i.e., no mesh component 1360 may be secured within sidewall cavity 1355. In some embodiments, mesh component 1360 may be permanently secured within sidewall cavity 1355. In some embodiments, mesh component 1360 may include a knob 1362 at one end of mesh component. Knob 1362 may serve as a point of attachment between mesh component 1360 and solid component 1350. In some embodiments, knob 1362 may be disposed outside of sidewall cavity 1355 when mesh component 1360 is fully inserted into sidewall cavity 1355. Knob 1362 may have a cross sectional area larger than the cross sectional area of the portion of mesh component 1360 configured to be inserted into sidewall cavity 1355.

In some embodiments, one or more sidewall cavities 1355 may be arranged in a longitudinal direction of sole 1340. In such embodiments, a sidewall cavity 1355 may extend in a direction from toe region 1342 to or toward heel region 1346. A mesh component 1360 may be inserted into a longitudinal sidewall cavity 1355 in the same manner as described for a transverse sidewall cavity 1355. In such embodiments, mesh component 1360 may serve as a torsion bar to support midfoot region 1344 of sole 1340. In some embodiments, sole 1340 may include one or more transverse sidewall cavities 1355 and one or more longitudinal sidewall cavities 1355.

Figure 19:
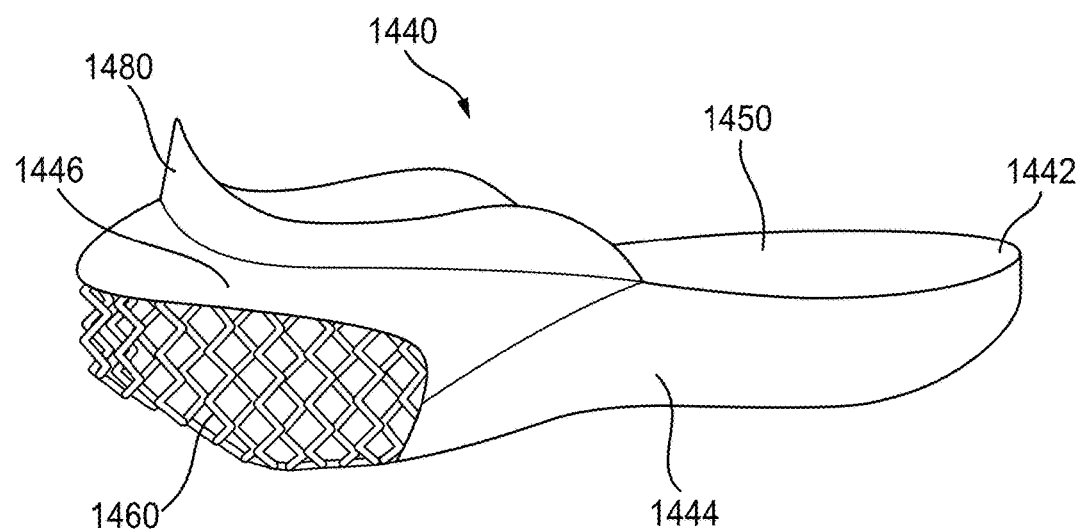
FIG. 19 shows a perspective view of a sole having a heel counter according to some embodiments.

In some embodiments, any of the soles described herein may be manufactured with a heel counter. In FIG. 19, a sole 1440 includes a solid component 1450 and a mesh component 1460 as described herein. Sole 1440 may further include a heel counter 1480. Heel counter 1480 may extend around a perimeter of heel region 1444 of sole 1440 to wrap around a wearer's heel during use. In some embodiments, heel counter 1480 may be an injection molded plastic. For example, heel counter 1480 may include injection molded nylon or TPU. In some embodiments, heel counter 1480 may be additively manufactured. In some embodiments, heel counter 1480 may be additively manufactured using an elastomeric polyurethane. In some embodiments, heel counter 1480 may be integrally formed with mesh component 1460. In such embodiments, mesh component 1460 and heel counter 1480 may be additively manufactured as one integrally formed unitary component. The mesh component 1460 and heel counter 1480 may be joined to solid component 1450 to form sole 1440.

Figure 20:
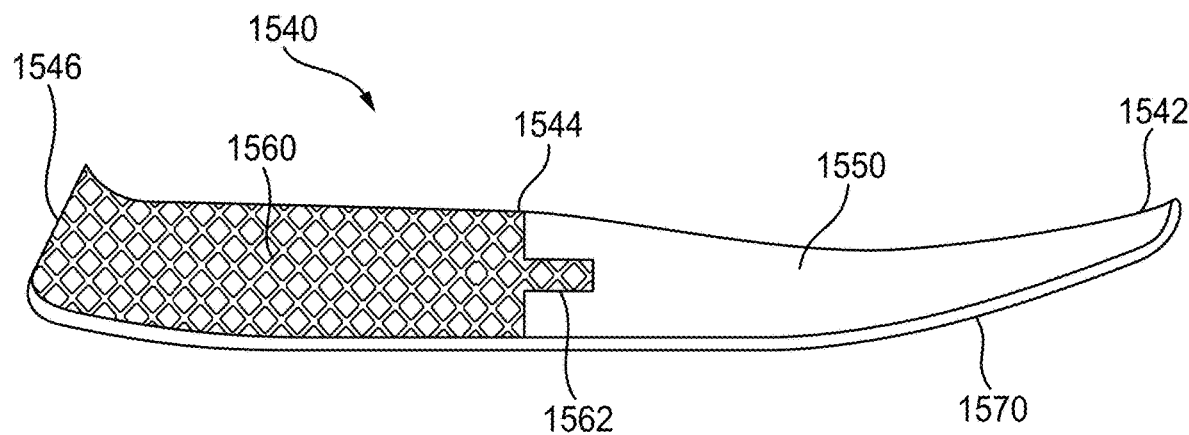
FIG. 20 shows a schematic view of a sole according to some embodiments.

Some embodiments described herein relate to a sole 1540 having a mesh component 1560 and a solid component 1550, as shown in FIG. 20. In this way, sole 1540 may have anisotropic properties due to difference in performance characteristics of the solid component and the mesh component. In some embodiments, mesh component 1560 may be arranged at a heel region 1546 and solid component 1550 may be arranged at toe region 1542 and may connect to mesh component 1560 at midfoot region 1544. However, in some embodiments, solid component 1550 may connected to mesh component 1560 closer to toe region 1542 of sole 1540. Mesh component 1560, solid component 1550, or both, may include a spacer material 1570 on a lower surface so that an outsole may be secured to the spacer material 1570 rather than directly to mesh component 1560 or solid component 1550. In some embodiments, mesh component 1560 may include protrusions 1562 configured to engage with solid component 1550 to facilitate connection of solid component 1550 to mesh component 1560. Protrusions 1562 may extend from mesh component 1560 in a direction toward toe region 1542. In some embodiments, solid component 1550 may be connected to mesh component 1560 so that solid component 1550 does not overlap with mesh component 1560.

In some embodiments, mesh component 1560 may be arranged at toe region 1542 and solid component 1550 may be arranged at heel region 1546.

In some embodiments, mesh component 1560 may extend from toe region 1542 to heel region 1546 so as to form the ground-engaging surface of sole, and solid component 1550 may be arranged on the upper surface of mesh component 1560 to provide a cushioned surface for contact with a foot of the wearer.

In some embodiments, an outsole may be applied to footwear or footwear component as described herein, and particularly to a sole of the footwear or footwear component. An outsole may be applied to footwear or footwear components by dipping the footwear component into an outsole material, such as a thermoplastic polyurethane (TPU). The outsole material may be in a molten or liquid form. Once the footwear is coated in the liquid polymer, the polymer may be allowed to cure and cool. The outsole material may be coated onto a bottom of the footwear component, or may be applied to a bottom and a portion of a side of footwear component.

Figure 21:
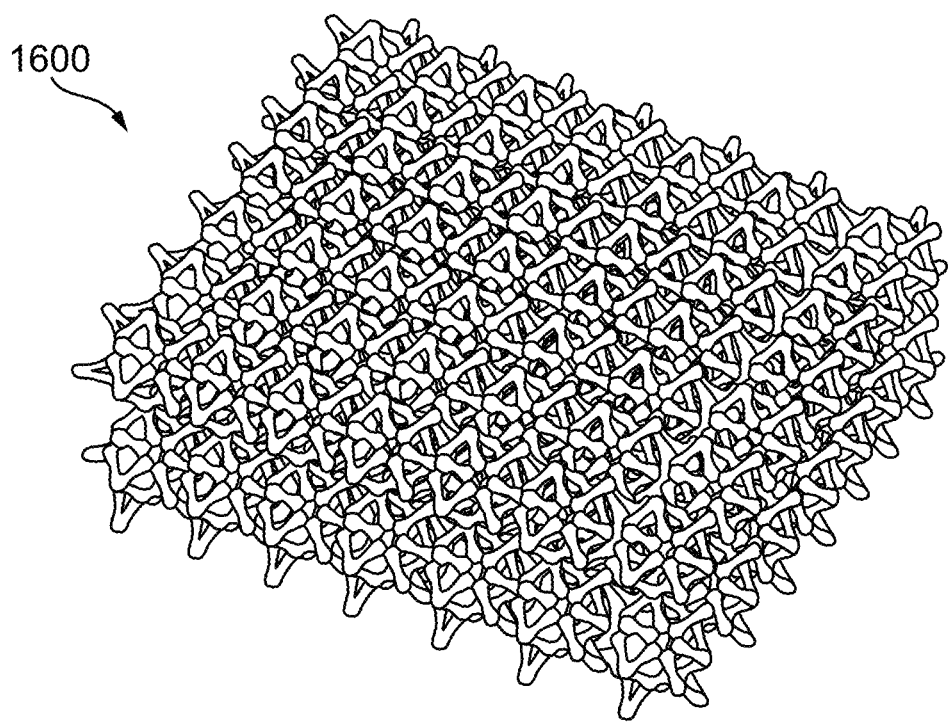
FIG. 21 shows a perspective view of a lattice structure for a mesh component according to some embodiments.
Figure 22:
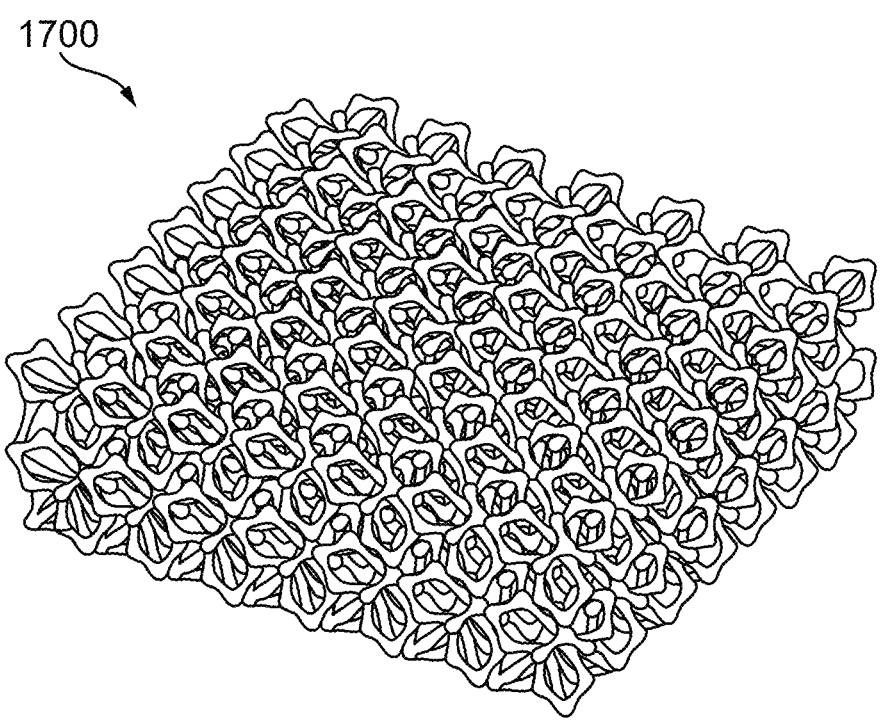
FIG. 22 shows a perspective view of a lattice structure for a mesh component according to some embodiments.

In any of the various embodiments described herein, a mesh component may have a lattice structure as shown in any of FIGS. 21-28. In some embodiments, mesh component may have a lattice structure 1600 having a spoke pattern, as shown in FIG. 21. Such lattice structure may be a 48-point cubic lattice. Such lattice structure may have improved shear stiffness relative to other lattice structures. In some embodiments, mesh component may have a lattice structure 1700 that is a shamrock pattern, as shown in FIG.

Figure 23:
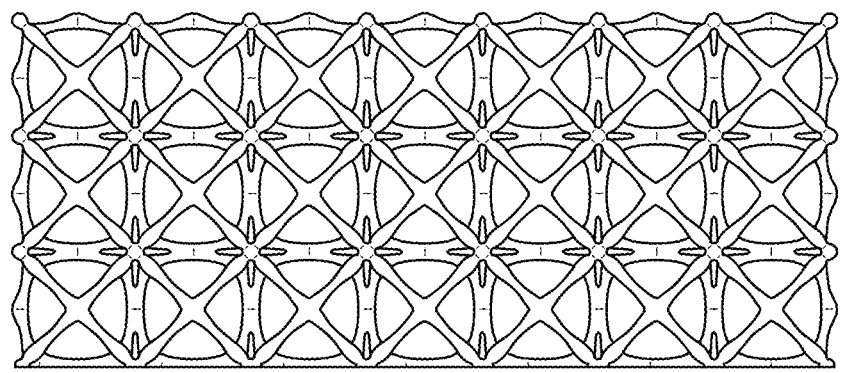
FIG. 23 shows a side view of a lattice structure for a mesh component according to some embodiments.
Figure 24:
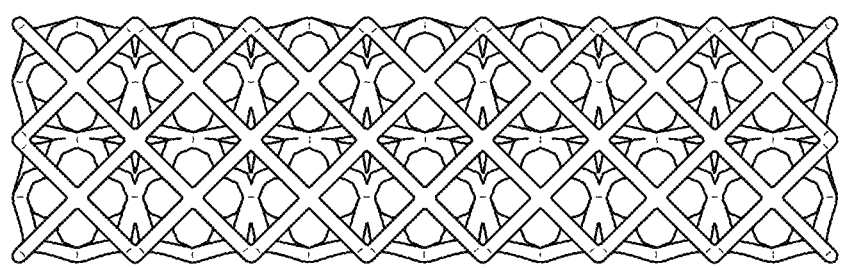
FIG. 24 shows a side view of a lattice structure for a mesh component according to some embodiments.
Figure 25:
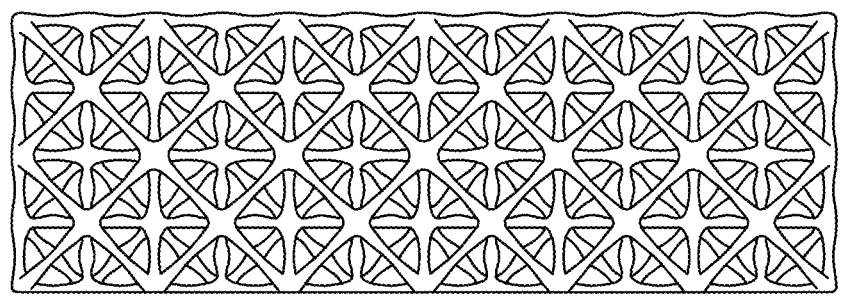
FIG. 25 shows a side view of a lattice structure for a mesh component according to some embodiments.
Figure 26:
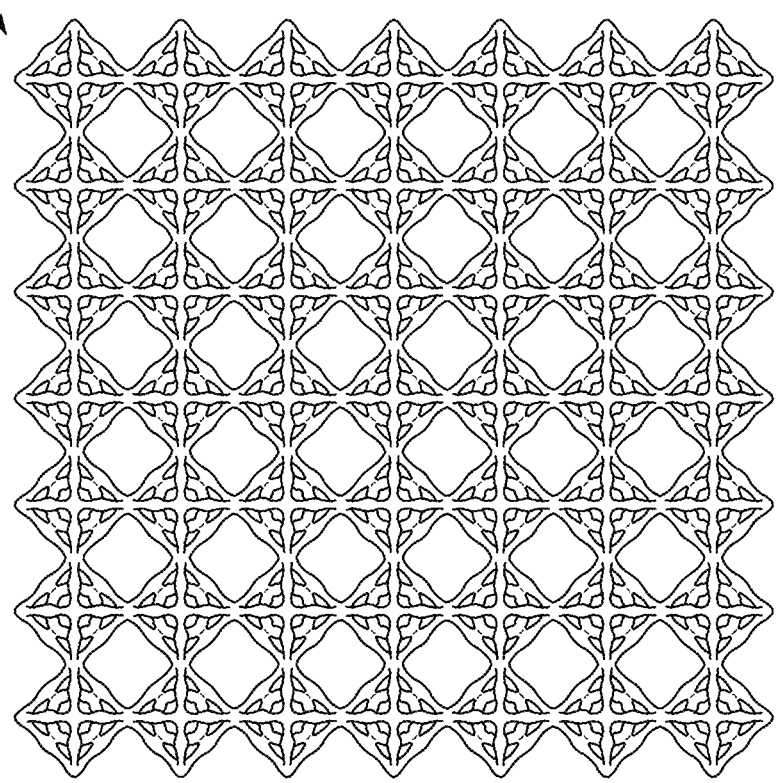
FIG. 26 shows a side view of a lattice structure for a mesh component according to some embodiments.
Figure 27:
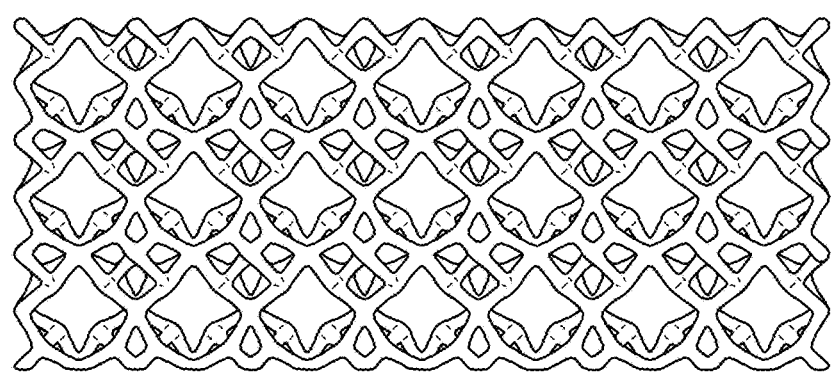
FIG. 27 shows a side view of a lattice structure for a mesh component according to some embodiments.
Figure 28:
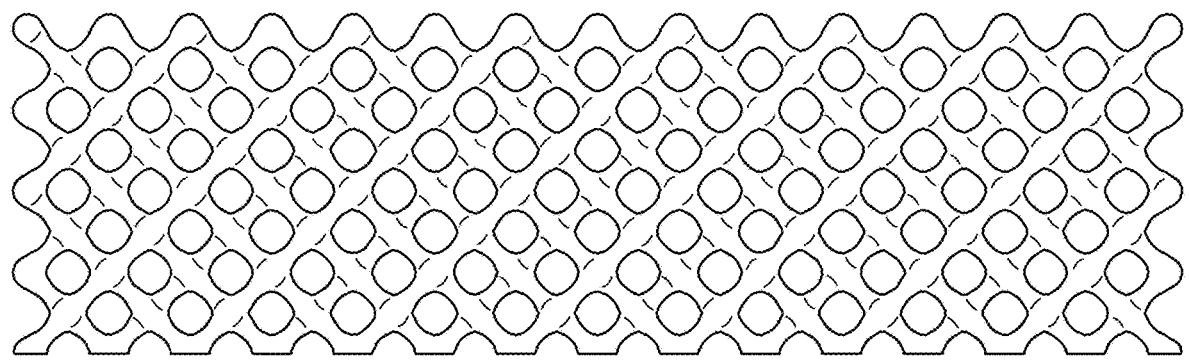
FIG. 28 shows a side view of a lattice structure for a mesh component according to some embodiments.

22. In such embodiments, lattice structure is a 48-point cubic lattice and may provide relatively high damping properties. In some embodiments, mesh component may have a lattice structure 1800 as shown in FIG. 23, a lattice structure 1900 as shown in FIG. 24, a lattice structure 2000 as shown in FIG. 25, a lattice structure 2100 as shown in FIG. 26, a lattice structure 2200 as shown in FIG. 27, or a lattice structure 2300 as shown in FIG. 28.

Figure 30B:
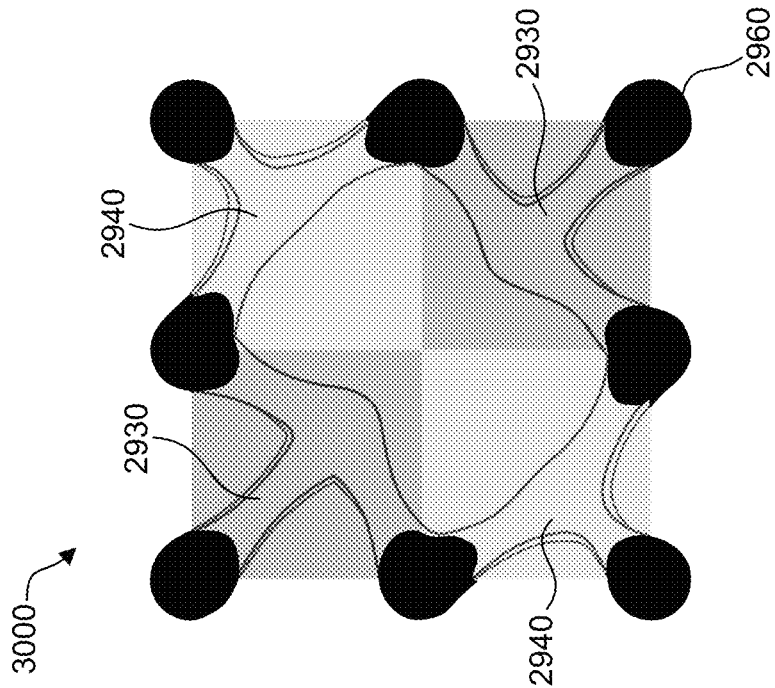
FIG. 30B is a side view of the unit cell shown in FIG. 30A.
Figure 30A:
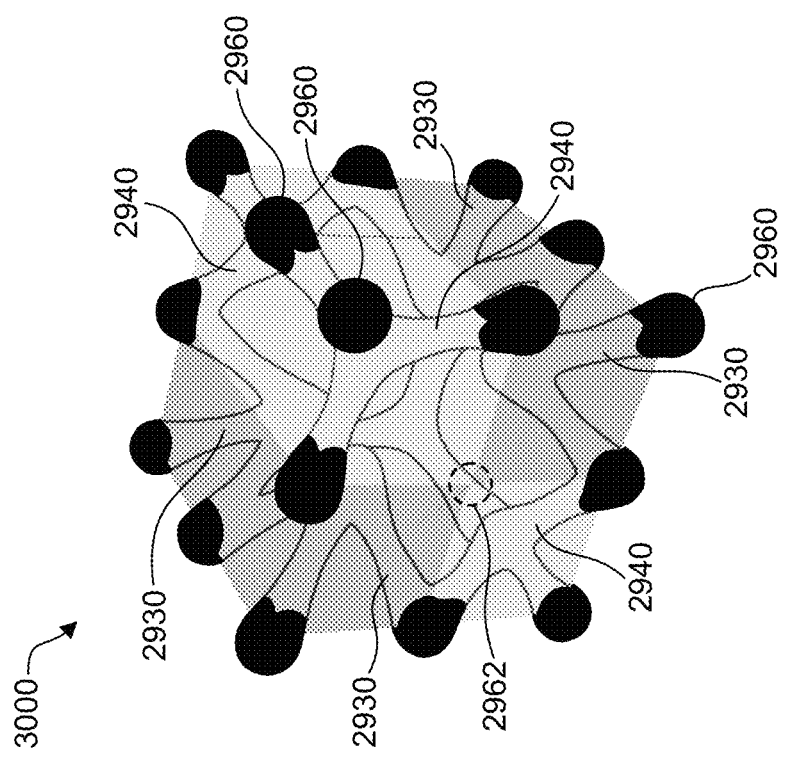
FIG. 30A is a perspective view of a unit cell according to some embodiments.

In some embodiments, a plurality of interconnected unit cells defining a mesh component can each include a soft sub-cell and a stiff sub-cell. In some embodiments, each of the plurality of interconnected unit cells can each include a plurality of soft sub-cells and a plurality of stiff sub-cells. In some embodiments, each of the plurality of interconnected unit cells can each include a plurality of the same soft sub-cells and a plurality of the same stiff sub-cells. FIGS. 30A and 30B illustrate exemplary soft-sub cells 2930 and stiff sub-cells 2940 according to some embodiments.

In some embodiments, every interconnected unit cell defining a mesh component can include a soft sub-cell and a stiff sub-cell. In some embodiments, every interconnected unit cell defining a mesh component can include a plurality of soft sub-cells and a plurality of stiff sub-cells. In some embodiments, every interconnected unit cell located in portions of a mesh component having a thickness, measured in vertical direction 30, at least a large as the thickness of a unit cell can include a soft sub-cell and a stiff sub-cell. In some embodiments, every interconnected unit cell located in portions of a mesh component having a thickness, measured in vertical direction 30, at least a large as the thickness of a unit cell can include a plurality of soft sub-cells and a plurality of stiff sub-cells.

In some embodiments, interconnected unit cells defining a mesh component can include eight sub-cells. In some embodiments, the eight sub-cells can include a plurality of soft sub-cells and a plurality of stiff sub-cells. In some embodiments, the eight sub-cells can include four soft sub-cells and four stiff sub-cells. In some embodiments, the eight sub-cells can include four of the same soft sub-cells and four of the same stiff sub-cells.

Soft sub-cells are composed of a plurality of struts and one or more nodes that define a portion of a unit cell. In other words, soft sub-cells are partial unit cells defining a portion of a unit cell. As used herein, a "soft sub-cell" is a sub-cell for a lattice structure having: (i) a modeled compressive modulus that is less than a modeled compressive modulus of a lattice structure for a "stiff sub-cell" defining a portion of the same unit cell, (ii) a modeled shear modulus that is less than a modeled shear modulus of a lattice structure for a "stiff sub-cell" defining a portion of the same unit cell, or (iii) both.

Stiff sub-cells are composed of a plurality of struts and one or more nodes that define a portion of a unit cell. In other words, stiff sub-cells are partial unit cells defining a portion of a unit cell. As used herein, a "stiff sub-cell" is a sub-cell for a lattice structure having (i) a modeled compressive modulus that is greater than a modeled compressive modulus of a lattice structure for a "soft sub-cell" defining a portion of the same unit cell, (ii) a modeled shear modulus that is greater than a modeled shear modulus of a lattice structure for a "soft sub-cell" defining a portion of the same unit cell, or (iii) both.

Figure 32A:
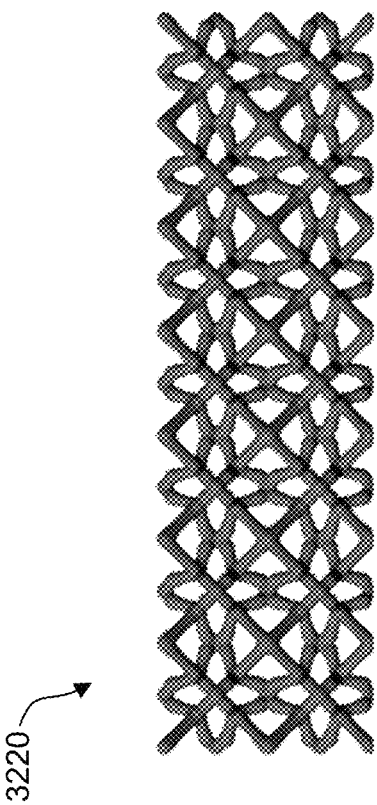
FIGS. 32A-32C show isotropic lattice structures for soft sub-cells according to some embodiments.
Figure 32B:
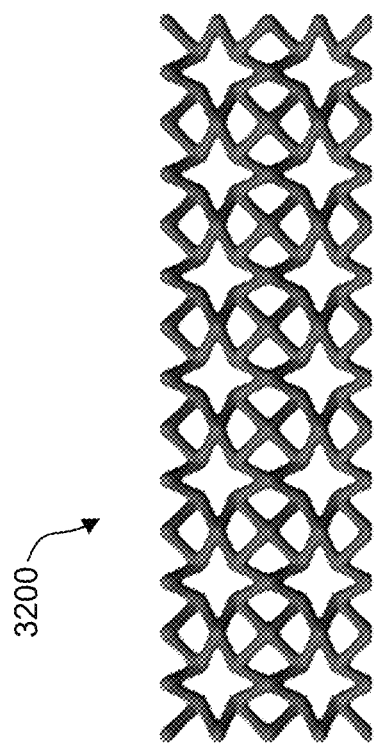
Figure 32C:
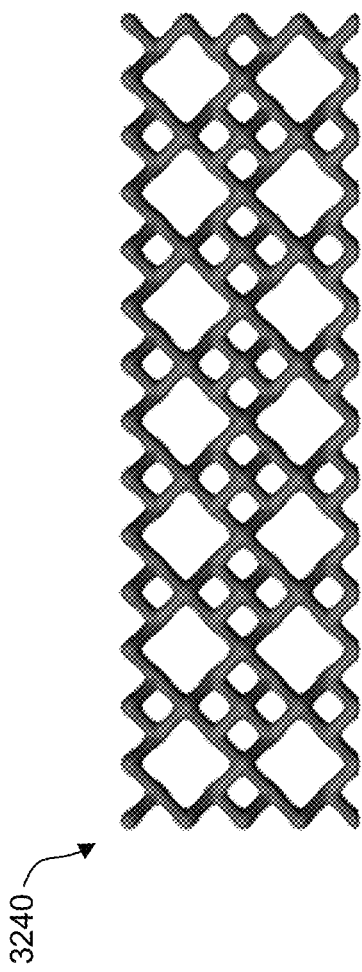

A soft sub-cell for a unit cell can be a sub-cell for a first lattice structure and a stiff sub-cell for the unit cells can be a sub-cell for a second lattice structure different from the first lattice structure. In some embodiments, the first lattice structure can be an isotropic lattice structure. In some embodiments, the second lattice structure can be an isotropic lattice structure. In some embodiments, the first lattice structure and the second lattice structure can be isotropic lattice structures. FIGS. 32A-32C show exemplary isotropic lattice structures 3200, 3220, 3240 for soft-sub cells according to some embodiments. FIGS. 33A-33C show exemplary isotropic lattice structures 3300, 3320, 3340 for stiff-sub cells according to some embodiments.

In some embodiments, the first lattice structure for soft sub-cells can have a first modeled compressive modulus and the second lattice structure for stiff sub-cells can have a second modeled compressive modulus 15% or more greater than the first modeled compressive modulus. In some embodiments, the first lattice structure for soft sub-cells can have a first modeled compressive modulus and the second lattice structure for stiff sub-cells can have a second modeled compressive modulus greater than the first modeled compressive modulus by 15% to 500%, including subranges. For example, the second lattice structure can have a second modeled compressive modulus that is 15% to 500% greater than the first modeled compressive modulus, 15% to 400% greater than the first modeled compressive modulus, 15% to 200% greater than the first modeled compressive modulus, 15% to 100% greater than the first modeled compressive modulus, 100% to 500% greater than the first modeled compressive modulus, or 200% to 500% greater than the first modeled compressive modulus, or within a range having any two of these values as endpoints.

In some embodiments, the first lattice structure for soft sub-cells can have a first modeled shear modulus and the second lattice structure for stiff sub-cells can have a second modeled shear modulus 15% or more greater than the first modeled shear modulus. In some embodiments, the first lattice structure for soft sub-cells can have a first modeled shear modulus and the second lattice structure for stiff sub-cells can have a second modeled shear modulus greater than the first modeled shear modulus by 15% to 500%, including subranges. For example, the second lattice structure can have a second modeled shear modulus that is 15% to 500% greater than the first modeled shear modulus, 15% to 400% greater than the first modeled shear modulus, 15% to 200% greater than the first modeled shear modulus, 15% to 100% greater than the first modeled shear modulus, 100% to 500% greater than the first modeled shear modulus, or 200% to 500% greater than the first modeled shear modulus, or within a range having any two of these values as endpoints.

As used herein, a "modeled compressive modulus" and a "modeled shear modulus" for a lattice structure are determined using the following model. A beam model simulation of a unit cell puck is modeled using FEA modeling software. Suitable FEA modeling software includes Abaqus FEA modeling software. For model efficiency purposes, a unit cell puck as small as a 3×3×1 unit cell puck can be used. A 3×3×1 unit cell puck includes one layer of 3 longitudinal rows of 3 unit cells arranged and adjacent to each other in the transverse direction as described herein. Other unit cell puck sizes can be used as long as the same size is used when comparing a modeled compressive modulus or a modeled shear modulus for two or more lattice structures. The unit cell puck is modeled as being sandwiched between and in contact with a top plate and a bottom plate. The following parameters were input into the FEA modeling software for the simulation: (1) material characteristics of the modeled struts for the unit cell puck (including density and elastic material properties), (2) the loading conditions, and (3) the contact mechanics between the unit cell puck and the two plates (including the frictional properties).

To determine a "modeled compressive modulus," a uniaxial compression load is applied by compressing the puck up to 50% strain using the top plate and capturing the resulting stress-strain curve. The modeled compressive modulus is calculated by measuring the slope of the stress-strain curve in the elastic deformation region.

To determine a "modeled shear modulus" the top plate is compressed with a 45-degree angle from the horizontal plane and the resulting stress-strain curve is captured. The modeled shear modulus is calculated by measuring the slope of the stress-strain curve in the elastic deformation region.

Figure 29B:
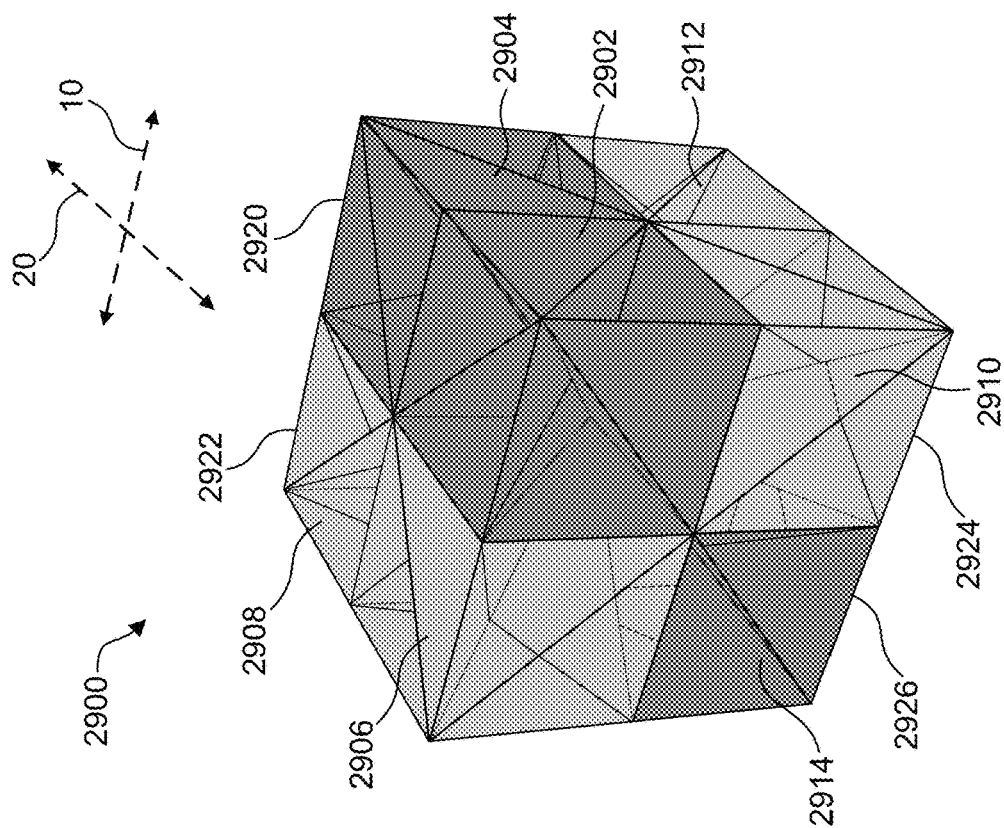
FIG. 29B is a second perspective of the lattice cell shown in FIG. 29A.
Figure 29A:
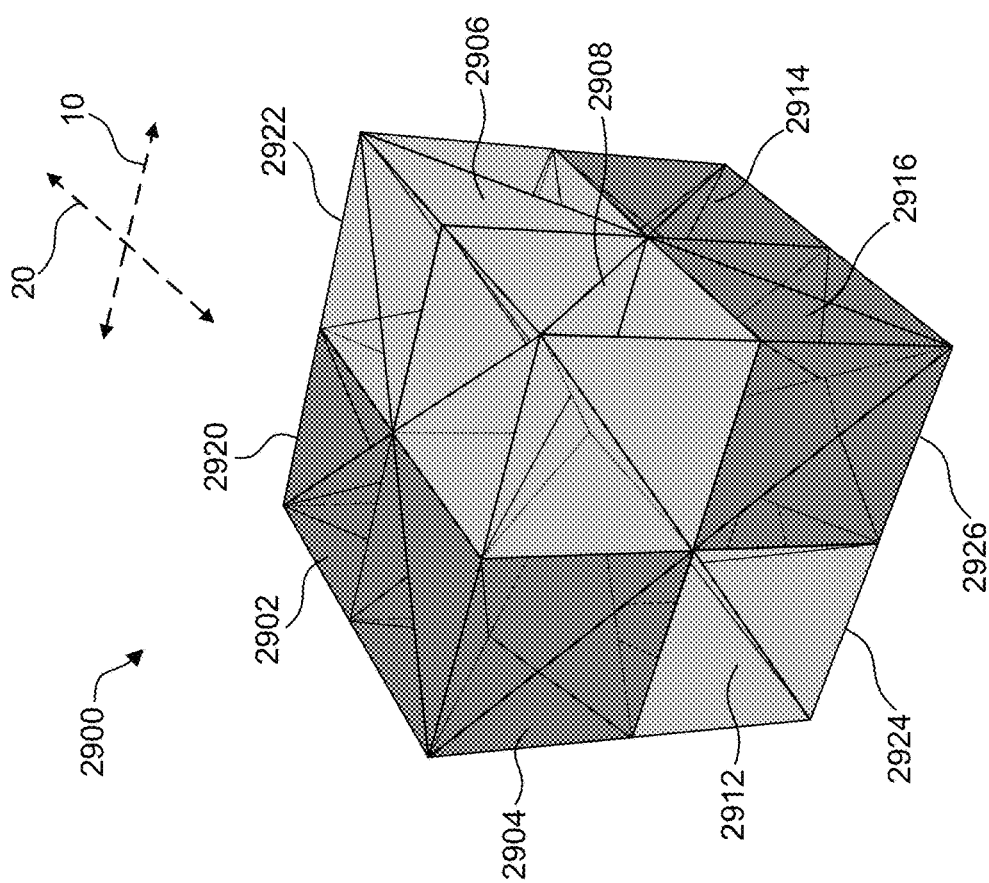
FIG. 29A is a first perspective view of a lattice cell according to some embodiments.

By arranging soft sub-cells and stiff-sub cells at different locations in unit cells, the mechanical properties of the unit cell, and therefore a mesh component, can be controlled. Unit cells for a mesh component can be populated and arranged in lattice cells for a lattice framework defining the volume of the mesh component. The location of soft sub-cells and stiff sub-cells in the unit cells can be defined by the location of the soft sub-cells and the stiff sub-cells in a lattice cell 2900 in which a unit cell is populated. FIGS. 29A and 29B show a lattice cell 2900 according to some embodiments. FIGS. 30A and 30B show a unit cell 3000 composed of soft sub-cells 2930 and stiff sub-cells 2940 located in lattice cell 2900 according to some embodiments.

In some embodiments, the location of soft sub-cells and stiff sub-cells in a lattice cell 2900 can be defined by the location of one or more soft sub-cells and one or more stiff sub-sub-cells in two or more of the following quadrants of lattice cell 2900: (i) an upper-forward quadrant 2920, (ii) an upper-rearward quadrant 2922, (iii) a lower-forward quadrant 2924, and (iv) a lower-rearward quadrant 2926. Upper-forward quadrant 2920 and upper-rearward quadrant 2922 are the two upper-most quadrants of a lattice cell 2900 in upward vertical direction 30. Upper-forward quadrant 2920 and upper-rearward quadrant 2922 are located above lower-forward quadrant 2924 and lower-rearward quadrant 2926, respectively. Upper-forward quadrant 2920 and lower-forward quadrant 2924 are the two forward-most quadrants of lattice cell 2900 in forward longitudinal direction 10. Upper-forward quadrant 2920 and lower-forward quadrant 2924 are located forward of upper-rearward quadrant 2922 and lower-rearward quadrant 2926, respectively. A unit cell 3000 populated in a lattice cell 2900 can also be described as having an upper-forward quadrant 2920, an upper-rearward quadrant 2922, a lower-forward quadrant 2924, and a lower-rearward quadrant 2926.

In some embodiments, unit cells 3000 of a mesh component can include one or more soft sub-cells located in upper-forward quadrant 2920. In some embodiments, unit cells 3000 of a mesh component can include two soft sub-cells located in upper-forward quadrant 2920.

In some embodiments, unit cells 3000 of a mesh component can include one or more stiff sub-cells located in upper-forward quadrant 2920. In some embodiments, unit cells 3000 of a mesh component can include two stiff sub-cells located in upper-forward quadrant 2920.

In some embodiments, unit cells 3000 of a mesh component can include one or more soft sub-cells located in upper-rearward quadrant 2922. In some embodiments, unit cells 3000 of a mesh component can include two soft sub-cells located in upper-rearward quadrant 2922.

In some embodiments, unit cells 3000 of a mesh component can include one or more stiff sub-cells located in upper-rearward quadrant 2922. In some embodiments, unit cells 3000 of a mesh component can include two stiff sub-cells located in upper-rearward quadrant 2922.

In some embodiments, unit cells 3000 of a mesh component can include one or more soft sub-cells located in lower-forward quadrant 2924. In some embodiments, unit cells 3000 of a mesh component can include two soft sub-cells located in lower-forward quadrant 2924.

In some embodiments, unit cells 3000 of a mesh component can include one or more stiff sub-cells located in lower-forward quadrant 2924. In some embodiments, unit cells 3000 of a mesh component can include two stiff sub-cells located in lower-forward quadrant 2924.

In some embodiments, unit cells 3000 of a mesh component can include one or more soft sub-cells located in lower-rearward quadrant 2926. In some embodiments, unit cells 3000 of a mesh component can include two soft sub-cells located in lower-rearward quadrant 2926.

In some embodiments, unit cells 3000 of a mesh component can include one or more stiff sub-cells located in lower-rearward quadrant 2926. In some embodiments, unit cells 3000 of a mesh component can include two stiff sub-cells located in lower-rearward quadrant 2926.

In some embodiments, unit cells 3000 of a mesh component can include the following sub-cells: (i) at least one soft sub-cell located in the upper-forward quadrant 2920, (ii) at least one stiff sub-cell located in the upper-rearward quadrant 2922, (iii) at least one stiff sub-cell located in the lower-forward quadrant 2924, and (iv) at least one soft sub-cell located in the lower-rearward quadrant 2926. In such embodiments, this arrangement of soft and stiff sub-cells can result in a mesh component capable of converting vertical loading energy into forward displacement, which can propel a wearer's foot forward when a sole including the mesh component contacts the ground during use. In other words, this arrangement of soft and stiff sub-cells can result in a mesh component predisposed to deform forwards (i.e., in forward longitudinal direction 10) when a sole including the mesh component contacts the ground.

The opposite result can be achieved by rotating the orientation of the unit cells 3000 by 180°. In such embodiments, unit cells 3000 of a mesh component can include the following sub-cells: (i) at least one stiff sub-cell located in the upper-forward quadrant 2920, (ii) at least one soft sub-cell located in the upper-rearward quadrant 2922, (iii) at least one soft sub-cell located in the lower-forward quadrant 2924, and (iv) at least one stiff sub-cell located in the lower-rearward quadrant 2926. In such embodiments, this arrangement of soft and stiff sub-cells can result in a mesh component that is predisposed to deform rearwards (i.e., in rearward longitudinal direction 10) when a sole including the mesh component contacts the ground.

FIGS. 30A and 30B show a lattice cell 2900 populated with soft sub-cells 2930 and stiff sub-cells 2940 for a unit cell 3000 according to some embodiments. The unit cell 3000 shown includes: (i) two soft sub-cells 2930 located side-by-side in the upper-forward quadrant 2920, (ii) two stiff sub-cells 2940 located side-by-side in the upper-rearward quadrant 2922, (iii) two stiff sub-cells 2940 located in the lower-forward quadrant 2924, and (iv) two soft sub-cells 2930 located in the lower-rearward quadrant 2926. This arrangement of soft and stiff sub-cells can result in a mesh component that is predisposed to deform forwards (i.e., in forward longitudinal direction 10) when a sole including the mesh component contacts the ground.

A mesh component predisposed to deform in a particular direction (for example, in a forward direction) can offer multiple advantages for a wearer. For example, forward motion created by the mesh component can yield improved efficiency while running. In other words, a mesh component predisposed to deform forward can reduce the energy a wearer is required expend to continue his or her forward motion. As another example, a mesh component predisposed to deform laterally (for example medially) can improve efficiency when a wearer changes direction by providing additional support under typical lateral loading conditions associated with, for example a lateral or medial cut during running.

In some embodiments, the location of soft sub-cells and stiff sub-cells in a lattice cell 2900 can be defined by the location of a soft sub-cell or a stiff sub-cell in two or more of the following eight zones of lattice cell 2900: (i) an upper-forward-medial zone 2902, (ii) an upper-forward-lateral zone 2904, (iii) an upper-rearward-medial zone 2906, (iv) an upper-rearward-lateral zone 2908, (v) a lower-forward-medial zone 2910, (vi) a lower-forward-lateral zone 2912, (vii) a lower-rearward-medial zone 2914, and (viii) a lower-rearward-lateral zone 2916. Upper-forward-medial zone 2902 and upper-forward-lateral zone 2904 are located in upper-forward quadrant 2920 of lattice cell 2900, with zone 2902 located medially to zone 2904 in transverse direction 20. Upper-rearward-medial zone 2906 and upper-rearward-lateral zone 2908 are located in upper-rearward quadrant 2922 of lattice cell 2900, with zone 2906 located medially to zone 2908 in transverse direction 20. Lower-forward-medial zone 2910 and lower-forward-lateral zone 2912 are located in lower-forward quadrant 2924 of lattice cell 2900, with zone 2910 located medially to zone 2912 in transverse direction 20. Lower-rearward-medial zone 2914 and lower-rearward-lateral zone 2916 are located in lower-rearward quadrant of lattice cell 2900, with zone 2914 located medially to zone 2916 in transverse direction 20.

A sub-cell located in upper-forward-medial zone 2902 can be referred to as an upper-forward-medial sub-cell. In some embodiments, an upper-forward-medial sub-cell can be a soft sub-cell. In some embodiments, an upper-forward-medial sub-cell can be a stiff sub-cell.

A sub-cell located in upper-forward-lateral zone 2904 can be referred to as an upper-forward-lateral sub-cell. In some embodiments, an upper-forward-lateral sub-cell can be a soft sub-cell. In some embodiments, an upper-forward-lateral sub-cell can be a stiff sub-cell.

A sub-cell located in upper-rearward-medial zone 2906 can be referred to as an upper-rearward-medial sub-cell. In some embodiments, an upper-rearward-medial sub-cell can be a soft sub-cell. In some embodiments, an upper-rearward-medial sub-cell can be a stiff sub-cell.

A sub-cell located in upper-rearward-lateral zone 2908 can be referred to as an upper-rearward-lateral sub-cell. In some embodiments, an upper-rearward-lateral sub-cell can be a soft sub-cell. In some embodiments, an upper-rearward-lateral sub-cell can be a stiff sub-cell.

A sub-cell located in lower-forward-medial zone 2910 can be referred to as a lower-forward-medial sub-cell. In some embodiments, a lower-forward-medial sub-cell can be a soft sub-cell. In some embodiments, a lower-forward-medial sub-cell can be a stiff sub-cell.

A sub-cell located in lower-forward-lateral zone 2912 can be referred to as a lower-forward-lateral sub-cell. In some embodiments, a lower-forward-lateral sub-cell can be a soft sub-cell. In some embodiments, a lower-forward-lateral sub-cell can be a stiff sub-cell.

A sub-cell located in lower-rearward-medial zone 2914 can be referred to as a lower-rearward-medial sub-cell. In some embodiments, a lower-rearward-medial sub-cell can be a soft sub-cell. In some embodiments, a lower-rearward-medial sub-cell can be a stiff sub-cell.

A sub-cell located in lower-rearward-lateral zone 2916 can be referred to as a lower-rearward-lateral sub-cell. In some embodiments, a lower-rearward lateral sub-cell can be a soft sub-cell. In some embodiments, a lower-rearward lateral sub-cell can be a stiff sub-cell.

FIGS. 30A and 30B show lattice cell 2900 populated with four soft sub-cells 2930 and four stiff sub-cells 2940 for a unit cell 3000 according to some embodiments. The unit cell 3000 shown includes: (i) an upper-forward-medial soft sub-cell 2930 located in upper-forward-medial zone 2902, (ii) an upper-forward-lateral soft sub-cell 2930 located in upper-forward-lateral zone 2904, (iii) an upper-rearward-medial stiff sub-cell 2940 located in upper-rearward-medial zone 2906, (iv) an upper-rearward-lateral stiff sub-cell 2940 located in upper-rearward-lateral zone 2908, (v) a lower-forward-medial stiff sub-cell 2940 located in lower-forward-medial zone 2910, (vi) a lower-forward-lateral stiff sub-cell 2940 located in lower-forward-lateral zone 2912, (vii) a lower-rearward-medial soft sub-cell 2930 located in lower-rearward-medial zone 2914, and (viii) a lower-rearward-lateral soft-sub cell 2930 located in lower-rearward-lateral zone 2916.

Sub-cells populated in lattice cell 2900 can include struts connected at a plurality of edge nodes 2960 located at edges of lattice cell 2900. In some embodiments, sub-cells populated lattice cell 2900 can include struts connected at a plurality of face nodes 2962 located on faces of lattice cell 2900. For structural integrity of a mesh component, it is preferred to populate lattice cells 2900 with soft and stiff sub-cells that share the same edge nodes 2960, and in embodiments including face nodes 2962, that share the same face nodes 2962. If soft and stiff sub-cells that do not share the same edge nodes 2960 and/or face nodes 2962 are populated into lattice cell 2900, it can result in a unit cell with one or more struts not connected to another strut within the mesh component.

Figure 34:
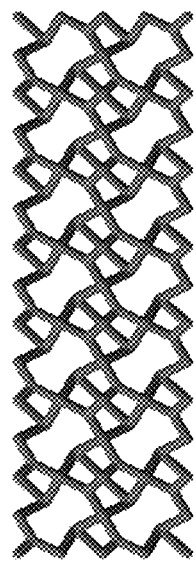
FIG. 34 is a perimeter structure according to some embodiments.

In some embodiments, the arrangement of soft sub-cells and stiff sub-cells as described herein can be leveraged to create a mesh component with a perimeter structure having a unique pattern. In some embodiments, a mesh component can have a perimeter sidewall defining a perimeter structure defined by soft sub-cells and stiff sub-cells arranged as described herein. The perimeter sidewall of a mesh component is defined by the forefoot end, heel end, medial side, and lateral side of the mesh component. The perimeter structure of the perimeter sidewall can be the perimeter structure in side view from medial transverse direction 20 or lateral transverse direction 20 of a mesh component. In some embodiments, a mesh component as described herein can have a perimeter sidewall defining a perimeter structure including the structure shown in FIG. 34.

In some embodiments, a mesh component as described herein can have a perimeter sidewall defining a perimeter structure having a plurality of eight-sided regions defined by eight struts and arranged in a pattern at the perimeter sidewall. The plurality of eight-sided regions defined by eight struts can have substantially the same size. In some embodiments, the plurality of eight-sided regions defined by eight struts can be arranged directly adjacent to each other at the perimeter sidewall. Directly adjacent eight-sided regions share one or more struts defining their eight-sided shapes. In some embodiments, the plurality of eight-sided regions defined by eight struts can each have a bowtie perimeter shape.

Figure 31:
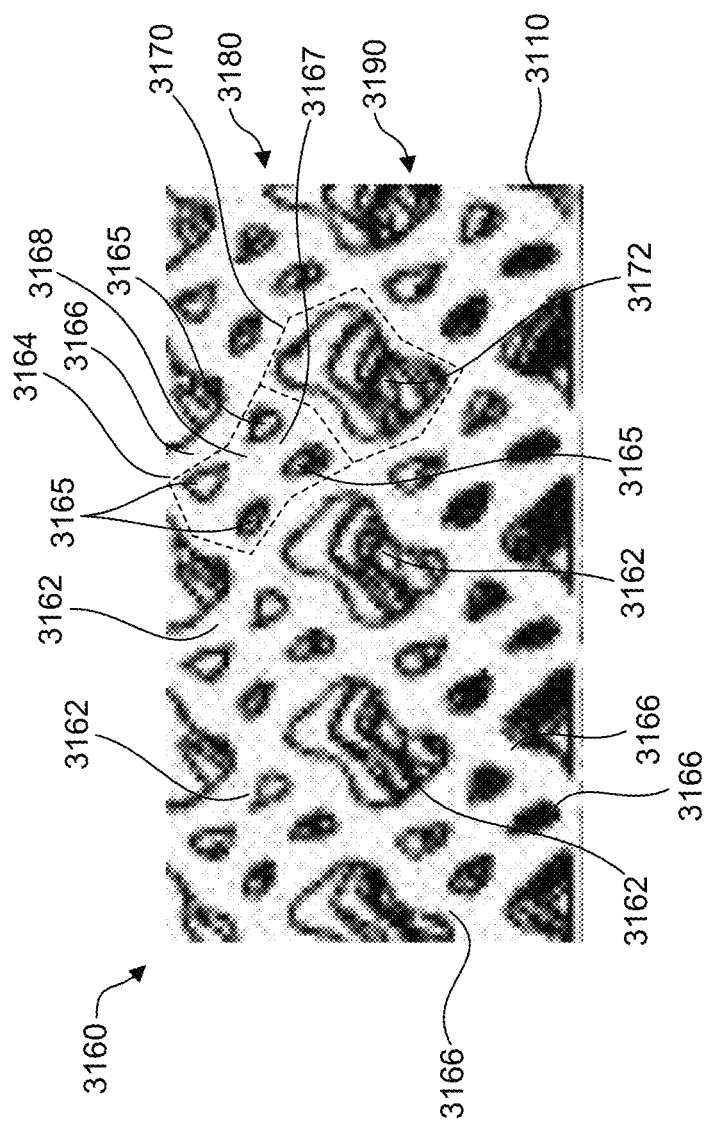
FIG. 31 shows a perimeter structure for a mesh component according to some embodiments.

FIG. 31 shows a perimeter sidewall 3110 for a mesh component with a perimeter structure 3160 according to some embodiments. Perimeter structure 3160 includes a plurality of eight-sided regions 3162 arranged directly adjacent to each other and having substantially the same size. Directly adjacent eight-sided regions 3162 share one or more border struts 3166. The plurality of eight-sided regions 3162 can be defined by eight border struts 3166 connected at eight nodes. As shown in FIG. 31, these eight-sided regions 3162 can have a bowtie perimeter shape (see dotted lines in FIG. 31).

In some embodiments, the plurality of eight-sided regions 3162 can include a first eight-sided region 3164 having four openings 3165 defined by four interior struts 3167 connected at an interior node 3168 and a second eight-sided region 3170 having a single opening 3172 defined by eight border struts 3166. In some embodiments, the plurality of eight-sided regions 3162 can include a plurality of first eight-sided regions 3164 having four openings 3165 defined by four interior struts 3167 connected at an interior node 3168 and a plurality of second eight-sided regions 3170 having a single opening 3172 defined by eight border struts 3166. An interior node 3168 is a node located within an eight-sided region 3162. Similarly, an interior strut 3167 is a strut that extends into an eight-sided region 3162. Border struts 3166 for an eight-sided region 3162 define the perimeter shape of the region 3162.

In some embodiments, the plurality of first eight-sided regions 3162 can be arranged in a first row 3180 extending in longitudinal direction 10 between a forefoot end of a mesh component and a heel end of the mesh component. In some embodiments, the plurality of second eight-sided regions 3170 can be arranged in a second row 3190 extending in longitudinal direction 10 between the forefoot end of the mesh component and the heel end of the mesh component. In some embodiments, first row 3180 can be located above second row 3190 in vertical direction 30. In some embodiments, first row 3180 can be located below second row 3190 in vertical direction 30. In some embodiments, as shown in FIG. 31, perimeter structure 3160 can include the structure shown in FIG. 34.

Where a range of numerical values comprising upper and lower values is recited herein, unless otherwise stated in specific circumstances, the range is intended to include the endpoints thereof, and all integers and fractions within the range. It is not intended that the disclosure or claims be limited to the specific values recited when defining a range. Further, when an amount, concentration, or other value or parameter is given as a range, one or more ranges, or as list of upper values and lower values, this is to be understood as specifically disclosing all ranges formed from any pair of any upper range limit or value and any lower range limit or value, regardless of whether such pairs are separately disclosed. Finally, when the term "about" is used in describing a value or an end-point of a range, the disclosure should be understood to include the specific value or end-point referred to. Whether or not a numerical value or end-point of a range recites "about," the numerical value or end-point of a range is intended to include two embodiments: one modified by "about," and one not modified by "about."

As used herein, the term "about" refers to a value that is within ±10% of the value stated. For example, about 10% can include any percentage between 9% and 11%.

It is to be appreciated that the Detailed Description section, and not the Summary and Abstract sections, is intended to be used to interpret the claims. The Summary and Abstract sections may set forth one or more but not all exemplary embodiments of the present invention(s) as contemplated by the inventors, and thus, are not intended to limit the present invention(s) and the appended claims in any way.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention(s) that others can, by applying knowledge within the skill of the art, readily modify and/or adapt for various applications such specific embodiments, without undue experimentation, and without departing from the general concept of the present invention(s). Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance herein.

What is claimed is:

1. An article of footwear, comprising:
    a sole comprising:
        a first solid component;
        a second solid component; and
        an additively manufactured mesh component arranged between the first solid component and the second solid component, wherein the mesh component is connected to each of the first solid component and the second solid component, and wherein the mesh component defines a channel extending from a medial side to a lateral side of the mesh component such that the mesh component extends beyond the channel both toward a toe end of the article of footwear and toward a heel end of the article of footwear, the channel being configured to allow the mesh component to bend at the channel; and
    an upper connected to the sole.

2. The article of footwear of claim 1, wherein the first solid component and the second solid component each comprises a foam material.

3. The article of footwear of claim 1, wherein the mesh component comprises a plurality of interconnected unit cells, and wherein the plurality of interconnected unit cells extends above the channel.

4. The article of footwear of claim 1, wherein the sole comprises a toe region, a midfoot region, and a heel region, and wherein the first solid component extends from the toe region toward the midfoot region.

5. The article of footwear of claim 4, wherein the second solid component is arranged at the heel region.

6. The article of footwear of claim 1, wherein the sole comprises a toe region, a midfoot region, and a heel region, wherein the mesh component extends from the lower end of the sole to the upper end of the sole, and wherein the mesh component extends from the midfoot region to the heel region.

7. The article of footwear of claim 1, wherein the mesh component of the sole overlaps with a portion of the upper.

8. The article of footwear of claim 1, wherein the mesh component defines a cavity.

9. The article of footwear of claim 8, wherein an insert is arranged within the cavity.

10. The article of footwear of claim 8, wherein particles are arranged within the cavity.

11. The article of footwear of claim 1, further comprising a filler material disposed within the mesh component.

12. The article of footwear of claim 11, wherein the mesh component comprises a port configured to facilitate injection of the filler material into the mesh component.

13. The article of footwear of claim 1, wherein the mesh component defines the channel at a bottom surface of the sole.

14. The article of footwear of claim 13, wherein the channel forms a gap between the mesh component and the second component at the bottom surface of the sole.

15. The article of footwear of claim 13, further comprising an outsole attached to the bottom surface of the sole, wherein a portion of the outsole is arranged within the channel.

16. The article of footwear of claim 15, wherein the outsole extends across the channel such that it is attached to the mesh component and the second solid component.

17. The article of footwear of claim 1, wherein a first portion of the mesh component is located between the channel and the first solid component, and a second portion of the mesh component is located between the channel and the second solid component.

18. A sole for an article of footwear, comprising:
   a first solid component comprising a foam material, wherein the first solid component is arranged at a toe region of the sole;
   a second solid component comprising a second foam material, wherein the second solid component is arranged at a heel region of the sole; and
   an additively manufactured mesh component arranged between the first solid component and the second solid component, wherein the mesh component is connected to the first solid component and to the second solid component, and wherein the mesh component defines a channel extending from a medial side to a lateral side of the mesh component at a bottom surface of the mesh component such that the channel creates a gap between a portion of the bottom surface of the mesh component and a bottom surface of the second solid component.

19. The sole of claim 18, wherein the foam material and the second foam material are the same material.

20. The sole of claim 18, wherein the mesh component extends from a lower end of the sole to an upper end of the sole, and wherein the lower end of the sole is a ground engaging surface.

21. The sole of claim 18, wherein the sole comprises a concave curvature at the heel region.

22. The article of footwear of claim 18, wherein the mesh component comprises a first surface connected to the first solid component and a second surface connected to the second solid component.

* * * * *

UNITED STATES PATENT AND TRADEMARK OFFICE
CERTIFICATE OF CORRECTION

| | |
|---|---|
| PATENT NO. | : 12,082,646 B2 |
| APPLICATION NO. | : 17/069623 |
| DATED | : September 10, 2024 |
| INVENTOR(S) | : Coonrod et al. |

Page 1 of 1

It is certified that error appears in the above-identified patent and that said Letters Patent is hereby corrected as shown below:

In the Claims

In Column 26, Claim 22, Line 25, replace "The article of footwear" with --The sole--.

Signed and Sealed this
Eighteenth Day of February, 2025

Coke Morgan Stewart
*Acting Director of the United States Patent and Trademark Office*